United States Patent
Beigman Klebanov et al.

(10) Patent No.: US 9,852,379 B2
(45) Date of Patent: Dec. 26, 2017

(54) SYSTEMS AND METHODS FOR CONSTRUCTED RESPONSE SCORING USING METAPHOR DETECTION

(71) Applicant: Educational Testing Service, Princeton, NJ (US)

(72) Inventors: Beata Beigman Klebanov, Hamilton, NJ (US); Chee Wee Leong, Levittown, PA (US); Michael Flor, Lawrenceville, NJ (US); Michael Heilman, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 469 days.

(21) Appl. No.: 14/640,955

(22) Filed: Mar. 6, 2015

(65) Prior Publication Data

US 2015/0254565 A1    Sep. 10, 2015

Related U.S. Application Data

(60) Provisional application No. 61/949,527, filed on Mar. 7, 2014, provisional application No. 62/127,629, filed on Mar. 3, 2015.

(51) Int. Cl.
*G06F 15/18* (2006.01)
*G06N 7/00* (2006.01)
*G06F 17/27* (2006.01)

(52) U.S. Cl.
CPC ......... *G06N 7/005* (2013.01); *G06F 17/2785* (2013.01)

(58) Field of Classification Search
USPC .......................................................... 706/12
See application file for complete search history.

(56) References Cited

U.S. PATENT DOCUMENTS 8,572,126 B2 * 10/2013 Flor ................. G06F 17/30625
                                                   707/797
8,819,047 B2 *  8/2014 Cucerzan .......... G06F 17/30864
                                                   707/706

(Continued)

OTHER PUBLICATIONS

Improved Automatic Keyphrase Extraction by Using Semantic Information XiaoLing Wang; DeJun Mu; Jun Fang 2008 International Conference on Intelligent Computation Technology and Automation (ICICTA) Year: 2008, vol. 1 pp. 1061-1065, DOI: 10.1109/ICICTA.2008.180 IEEE Conference Publications.*

(Continued)

*Primary Examiner* — Michael B Holmes
(74) *Attorney, Agent, or Firm* — Jones Day

(57) ABSTRACT

Systems and methods described herein utilize supervised machine learning to generate a figure-of-speech prediction model for classify content words in a running text as either being figurative (e.g., as a metaphor, simile, etc.) or non-figurative (i.e., literal). The prediction model may extract and analyze any number of features in making its prediction, including a topic model feature, unigram feature, part-of-speech feature, concreteness feature, concreteness difference feature, literal context feature, non-literal context feature, and off-topic feature, each of which are described in detail herein. Since uses of figure of speech in writings may signal content sophistication, the figure-of-speech prediction model allows scoring engines to further take into consideration a text's use of figure of speech when generating a score.

35 Claims, 13 Drawing Sheets

(56) References Cited

U.S. PATENT DOCUMENTS

| | | | | |
|---|---|---|---|---|
| 9,208,139 | B2* | 12/2015 | Madnani | G06F 17/241 |
| 9,519,634 | B2* | 12/2016 | Flor | G06F 17/277 |
| 2014/0295399 | A1* | 10/2014 | Higgins | G09B 7/02 |
| | | | | 434/362 |
| 2014/0302469 | A1* | 10/2014 | Chen | G09B 19/00 |
| | | | | 434/236 |
| 2014/0343923 | A1* | 11/2014 | Heilman | G06F 17/2785 |
| | | | | 704/9 |
| 2015/0248608 | A1* | 9/2015 | Higgins | G06N 3/08 |
| | | | | 706/16 |
| 2015/0254565 | A1* | 9/2015 | Beigman Klebanov | |
| | | | | G06N 7/005 |
| | | | | 706/12 |
| 2015/0269529 | A1* | 9/2015 | Kyllonen | G06Q 10/1053 |
| | | | | 705/321 |
| 2015/0347385 | A1* | 12/2015 | Flor | G06F 17/2715 |
| | | | | 704/9 |
| 2016/0133147 | A1* | 5/2016 | Deane | G09B 7/02 |
| | | | | 434/353 |
| 2016/0162806 | A1* | 6/2016 | Beigman Klebanov | |
| | | | | G06N 99/005 |
| | | | | 706/12 |

OTHER PUBLICATIONS

Combining Conditional Random Fields and first-order logic for modeling hidden content structure in sentiment analysis Lei Wu; Yinghua Zhang; Wensheng Zhang; Jue Wang 2013 Ninth International Conference on Natural Computation (ICNC) Year: 2013 pp. 1082-1087, DOI: 10.1109/ICNC.2013.6818138 IEEE Conference Publications.*

Topic Models for Word Sense Disambiguation and oken-based Idiom Detection Linlin Li, Benjamin Roth, Caroline Sporleder Saarland University, Postfach 15 11 50 66041 Saarbrucken, Germany Proceeding ACL '10 Proceedings of the 48th Annual Meeting of the Association for Computational Linguistics pp. 1138-1147 Uppsala, Sweden—Jul. 11-16, 2010.*

Assaf, Dan, Neuman, Yair, Cohen, Yohai, Argamon, Shlomo, Howard, Newton, Last, Mark, Frieder, Ophir, Koppel, Moshe; Why 'Dark Thoughts' Aren't Really Dark: A Novel Algorithm for Metaphor Identification; IEEE Symposium on Computational Intelligence, Cognitive Algorithms, Mind, and Brain; pp. 60-65; Apr. 2013.

Charteris-Black, Jonathan; Politicians and Rhetoric: The Persuasive Power of Metaphor; Palgrave MacMillan: Houndmills, UK; 2005.

Goatly, Andrew; The Language of Metaphors; Routledge: London, UK; 2011.

Lakoff, George, Johnson, Mark; Metaphors We Live by; University of Chicago Press: Chicago, IL; 1980.

Martin, James; A Computational Model of Metaphor Interpretation; Academic Press, Inc: San Diego, CA; 1990.

McNemar, Quinn; Note on the Sampling Error of the Difference Between Correlated Proportions or Percentages; Psychometrika, 12(2); pp. 153-157; Jun. 1947.

Musolff, Andreas; Mirror Images of Europe: The Imagery Used in the Public Debate About European Politics in Britain and Germany; Iudicium Verlag GmbH: Munich, Germany; 2000.

Pragglejaz Group; MIP: A Method for Identifying Metaphorically Used Words in Discourse; Metaphor and Symbol, 22(1); pp. 1-39; 2007.

Beigman Klebanov, Beata, Flor, Michael; Argumentation-Relevant Metaphors in Test-Taker Essays; Proceedings of the 1st Workshop on Metaphor in NLP; pp. 11-20; Jun. 2013.

Beigman Klebanov, Beata, Flor, Michael; Leong, Ben, Bruno, James; Metaphor: Final Report for SELT Initiative 2014; Educational Testing Service: Princeton, NJ; 2014.

Beigman Klebanov, Beata, Leong, Chee Wee, Flor, Michael; Supervised Word-Level Metaphor Detection: Experiments with Concreteness and Reweighting of Examples; Educational Testing Service: Princeton, NJ; Mar. 2015.

Beigman Klebanov, Beata, Beigman, Eyal, Diermeier, Daniel; Analyzing Disagreements; Proceedings of the Workshop on Human Judgments in Computational Linguistics; pp. 2-7; Aug. 2008.

Beigman Klebanov, Beata, Leong, Chee Wee, Heilman, Michael, Flor, Michael; Different Texts, Same Metaphors= Unigrams and Beyond; Proceedings of the 2nd Workshop on Metaphor in NLP; pp. 11-17; Jun. 2014.

Bethard, Steven, Tzuyin Lai, Vicky, Martin, James; Topic Model Analysis of Metaphor Frequency for Psycholinguistic Stimuli; Proceedings of the NAACL HLT Workshop on Computational Linguistic Creativity; pp. 9-16; Jun. 2009.

Bird, Steven; NLTK: The Natural Language Toolkit; Proceedings of the COLING/ACL, Interactive Presentation Session; pp. 69-72; Jul. 2006.

Blanchard, Daniel, Heilman, Michael, Madnani, Nitin; SciKit-Learn Laboratory; GitHub repository, https://github.com/EducationalTestingService/skll.; 2013.

Blei, David, Ng, Andrew, Jordan, Michael; Latent Dirichlet Allocation; Journal of Machine Learning Research, 3; pp. 993-1022; Jan. 2003.

Brysbaert, Marc, Warriner, Amy Beth, Kuperman, Victor; Concreteness Ratings for 40 Thousand Generally Known English Word Lemmas; Behavior Research Methods, 46(3); pp. 904-911; Sep. 2014.

De Marneffe, Marie-Catherine, MacCartney, Bill, Manning, Christopher; Generating Typed Dependency Parses from Phrase Structure Parses; Proceedings of LREC; p. 449-454; 2006.

Dunn, Jonathan; Multi-Dimensional Abstractness in Cross-Domain Mappings; Proceedings of the 2nd Workshop on Metaphor in NLP; pp. 27-32; Jun. 2014.

Dunn, Jonathan; What Metaphor Identification Systems Can Tell Us About Metaphor-In-Langauge; Proceedings of the 1st Workshop on Metaphor in NLP; pp. 1-10; Jun. 2013.

Fass, Dan; met*: A Method for Discriminating Metonymy and Metaphor by Computer; Computational Linguistics, 17(1); pp. 49-90; 1991.

Gale, William, Church, Kenneth, Yarowsky, David; One Sense Per Discourse; Proceedings of the Speech and Natural Language Workshop; pp. 233-237; 1992.

Gandy, Lisa, Allan, Nadji, Atallah, Mark, Frieder, Ophir, Howard, Newton, Kanareykin, Sergey, Kopel, Moshe, Last, Mark, Neuman, Yair, Argamon, Shlomo; Automatic Identification of Conceptual Metaphors With Limited Knowledge; Proceedings of the 27th AAAI Conference on Artificial Intelligence; Jun. 2013.

Gedigian, Matt, Bryant, John, Narayanan, Srini, Ciric, Branimir; Catching Metaphors; Proceedings of the 3rd Workshop on Scalable Natural Language Understanding; pp. 41-48; 2006.

He, Haibo, Garcia, Edwardo; Learning from Imbalanced Data; IEEE Transactions on Knowledge and Data Engineering, 21(9); pp. 1263-1284; Sep. 2009.

Heintz, Ilana, Gabbard, Ryan, Srinivasan, Mehesh, Barner, David, Black, Donald, Freedman, Marjorie, Weischedel, Ralph; Automatic Extraction of Linguistic Metaphor with LDA Topic Modeling; Proceedings of the 1st Workshop on Metaphor in NLP; pp. 58-66; Jun. 2013.

Hill, Felix, Korhonen, Anna; Concreteness and Subjectivity as Dimensions of Lexical Meaning; Proceedings of the 52nd Annual Meeting of the Association for Computational Linguistics; pp. 725-731; Jun. 2014.

Hovy, Dirk, Srivastava, Shashank, Jauhar, Sujay, Sachan, Mrinmaya, Goyal, Kartik, Li, Huiying, Sanders, Whitney, Hovy, Eduard; Identifying Metaphorical Word Use with Tree Kernels; Proceedings of the 1st Workshop on Metaphor in NLP; pp. 52-57; Jun. 2011.

Jang, Hyeju, Piergallini, Mario, Wen, Miaomiao, Penstein Rose, Carolyn; Conversational Metaphors in Use: Exploring the Contrast between Technical and Everyday Notions of Metaphor; Proceedings of the 2nd Workshop on Metaphor in NLP; pp. 1-10; Jun. 2014.

Koeling, Rob, McCarthy, Diana, Carroll, John; Domain-Specific Sense Distributions and Predominant Sense Acquisition; Proceedings of Human Language Technology Conference and Conference on Empirical Methods in Natural Language Processing; pp. 419-426; Oct. 2005.

(56) References Cited

OTHER PUBLICATIONS

Li, Hongsong, Zhu, Kenny, Wang, Haixun; Data-Driven Metaphor Recognition and Explanation; Transactions of the Association for Computational Linguistics, 1; pp. 379-390; Oct. 2013.
Mohler, Michael, Bracewell, David, Hinote, David, Tomlinson, Marc; Semantic Signatures for Example-Based Linguistic Metaphor Detection; Proceedings of the 1st Workshop on Metaphor in NLP; pp. 27-35; Jun. 2013.
Muller, Philippe, Fabre, Cecile, Adam, Clementine; Predicting the Relevance of Distributional Semantic Similarity with Contextual Information; Proceedings of the 52nd Annual Meeting of the Association for Computational Linguistics; pp. 479-488; Jun. 2014.
Neuman, Yair, Assaf, Dan, Cohen, Yohai, Last, Mark, Argamon, Shlomo, Howard, Newton, Frieder, Ophir; Metaphor Identification in Large Texts Corpora; PLOS ONE, 8(4); Apr. 2013.
Parker, Robert, Graff, David, Kong, Junbo, Chen, Ke, Maeda, Kazuaki; English Gigaword Fourth Edition, LDC2009T13; Linguistic Data Consortium; 2009.
Pasanek, Brad, Sculley, D.; Mining Millions of Metaphors; Literary and Linguistic Computing, 23(3); pp. 345-360; 2008.
Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.
Rehurek, Radim, Sojka, Petr; Software Framework for Topic Modelling With Large Corpora; Proceedings of the LREC Workshop on New Challenges for NLP Framework; pp. 45-50; May 2010.
Sandhaus, Evan; The New York Times Annotated Corpus, LDC2008T19; Linguistic Data Consortium; 2008.
Schulder, Marc, Hovy, Eduard; Metaphor Detection Through Term Relevance; Proceedings of the 2nd Workshop on Metaphor in NLP; pp. 18-26; Jun. 2014.
Shutova, Ekaterina, Teufel, Simone, Korhonen, Anna; Statistical Metaphor Processing; Computational Linguistics, 39(2); 2012.
Shutova, Ekaterina, Sun, Lin; Unsupervised Metaphor Identification Using Hierarchical Graph Factorization Clustering; Proceedings of NAACL HLT; pp. 978-988; Jun. 2013.
Shutova, Ekaterina, Teufel, Simone; Metaphor Corpus Annotated for Source: Target Domain Mappings; Proceedings of the 7th International Conference on Language Resources and Evaluation; pp. 3255-3261; May 2010.
Shutova, Ekaterina, Sun, Lin, Korhonen, Anna; Metaphor Identification Using Verb and Noun Clustering; Proceedings of the 23rd International Conference on Computational Linguistics; pp. 1002-1010; 2010.
Steen, Gerard, Dorst, Aletta, Herrmann, J. Berenike, Kaal, Anna, Krennmayr, Tina, Pasma, Trijntje; A Method for Linguistic Metaphor Identification; John Benjamins Publishing Company: Amsterdam; 2010.
Strzalkowski, Tomek, Broadwell, George, Taylor, Sarah, Feldman, Laurie, Yamrom, Boris, Shaikh, Samira, Liu, Ting, Cho, Kit, Boz, Umit, Cases, Ignacio, Elliott, Kyle; Robust Extraction of Metaphors from Novel Data; Proceedings of the 1st Workshop on Metaphor in NLP; pp. 67-76; Jun. 2013.
Toutanova, Krishna, Klein, Dan, Manning, Christopher, Singer, Yoram; Feature-Rich Part-of-Speech Tagging with a Cyclic Dependency Network; Proceedings of NAACL; pp. 252-259; 2003.
Tsvetkov, Yulia, Mukomel, Elena, Gershman, Anatole; Cross-Lingual Metaphor Detection Using Common Semantic Features; Proceedings of the 1st Workshop on Metaphor in NLP; pp. 45-51; Jun. 2013.
Tsvetkov, Yulia, Boytsov, Leonid, Gershman, Anatole, Nyberg, Eric, Dyer, Chris; Metaphor Detection with Cross-Lingual Model Transfer; Proceedings of the 52nd Annual Meeting of the Association for Computational Linguistics; pp. 248-258; Jun. 2014.
Turney, Peter, Neuman, Yair, Assaf, Dan, Cohen, Yohai; Literal and Metaphorical Sense Identification Through Concrete and Abstract Context; Proceedings of the Conference on Empirical Methods in Natural Language Processing; pp. 680-690; Jul. 2011.
Yang, Xuesong, Loukina, Anastassia, Evanini, Keelan; Machine Learning Approaches to Improving Pronunciation Error Detection on an Imbalanced Corpus; Proceedings of IEEE Spoken Language Technology Workshop; pp. 300-305; 2014.

* cited by examiner

SYSTEMS AND METHODS FOR CONSTRUCTED RESPONSE SCORING USING METAPHOR DETECTION

CROSS-REFERENCE TO RELATED APPLICATIONS

The present application claims the benefit of U.S. Provisional Application Ser. No. 61/949,527, entitled "Difference Texts, Same Metaphors; Unigrams and Beyond," filed Mar. 7, 2014, the entirety of which is hereby incorporated by reference. The present application further claims the benefit of U.S. Provisional Application Ser. No. 62/127,629, entitled, "Systems and Methods for Metaphor Detection in Constructed Responses," filed Mar. 3, 2015, the entirety of which is hereby incorporated by reference.

FIELD

This disclosure is related generally to automated evaluation models and more particularly to automated prediction/identification of figure of speech in text.

BACKGROUND

Automated scoring technology analyzes features of written text to assess/evaluate the quality of constructed responses (e.g., essays). While existing automated scoring models may analyze features relating to syntactic sophistication (e.g., such as features measuring sentence variety), there is currently no feature that could effectively capture content sophistication.

SUMMARY

Content sophistication of writings may be evidenced by the use of figure of speech (e.g., metaphors, similes, etc.). For example, novel metaphors could signal sophisticated and creative use of language (e.g., comparing electronic communication wires to a spider web). Based on this observation, systems and methods for automatically detecting figure of speech are described herein. This capability could be used in a variety of application, such as scoring constructed responses, estimating the complexity/readability of a text, identifying challenging or striking use of language, among others.

The systems and methods described herein analyze written texts, extract various features therefrom, and transform the extracted features into conclusions (e.g., scores) such that no human judgment may be necessary. Machine evaluation provides numerous advantages over human evaluation. Holistic scoring by human is based on the impression of scorers, which is by nature imprecise and inconsistent. While human scorers may be given instructions to score analytically based on specific aspects of writing (e.g., mechanics, flow, sentence structure, etc.), humans unfortunately do not perform such analytic assessment well, especially as the number of target aspects increase. Moreover, human scoring is extremely time consuming, which may become prohibitive when the number of written texts to be scored is numerous (e.g., such as in standardized tests). The systems and methods described herein allow machines to automatically identify and use figure-of-speech to assess written content sophistication, thus providing quick and objective means for scoring written text in a manner that cannot be matched by humans.

According to one example, a computer-implemented method of generating a model for predicting whether a content word is being used figuratively is described. The method comprises accessing a plurality of training texts, each training text including content words, and each content word having a corresponding annotation indicating whether the content word is being used figuratively in the associated training text. The method further comprises accessing a plurality of topic models generated from a first corpus. For each content word in the plurality of training texts, a plurality of topic-model feature scores are assigned to the content word, each topic-model feature score being associated with one of the plurality of topic models and determined by: determining a first probability of the content word being used in a topic represented by the topic model; determining a second probability of the content word being used in a second corpus; and computing the topic-model feature score using the first probability and the second probability. The method further comprises generating a prediction model for predicting whether a content word is being used figuratively. The generating of the prediction model is on at least one of the plurality of topic-model feature scores and the annotations.

According to another example, the aforementioned method's computing of the topic-model feature score includes taking a logarithm of a ratio of the first probability to the second probability. According to another example, the aforementioned method's generating of the prediction model includes using logistic regression. According to another example of the aforementioned method, each content word is one of a noun, a verb, an adjective, and an adverb. According to yet another example of the aforementioned method, the plurality of topic models are generated using Latent Dirichlet Allocation.

According to another example, a computer-implemented method of scoring a text based on at least predicted figurative word use in the constructed texts is described. The method comprises accessing a text to be evaluated and identifying content words in the text. The method further comprises extracting one or more features from each of the content words. The method further comprises predicting whether each of the content words is being used figuratively in the text, the predicting being based on a prediction model and the extracted one or more features. The method further comprises generating an evaluation score for the text based on the predictions. The one or more features include at least one of a topic model feature, a unigram feature, a part-of-speech feature, a concreteness feature, a concreteness difference feature, a literal context feature, a non-literal context feature, and an off-topic feature.

Exemplary systems comprising a processing system and a memory for carrying out the method are also described. Exemplary non-transitory computer readable media having instructions adapted to cause a processing system to execute the method are also described.

DETAILED DESCRIPTION

Systems and methods described herein utilize supervised machine learning to generate a figure-of-speech prediction model for classify content words in a running text as either being figurative (e.g., as a metaphor, simile, etc.) or non-figurative (i.e., literal). The system can be implemented using any suitable combination of hardware, software, and/or firmware using algorithms implemented in any suitable programming language such that a processing system of a computer system is configured to carry out the exemplary approaches described herein.

Figure 1A:
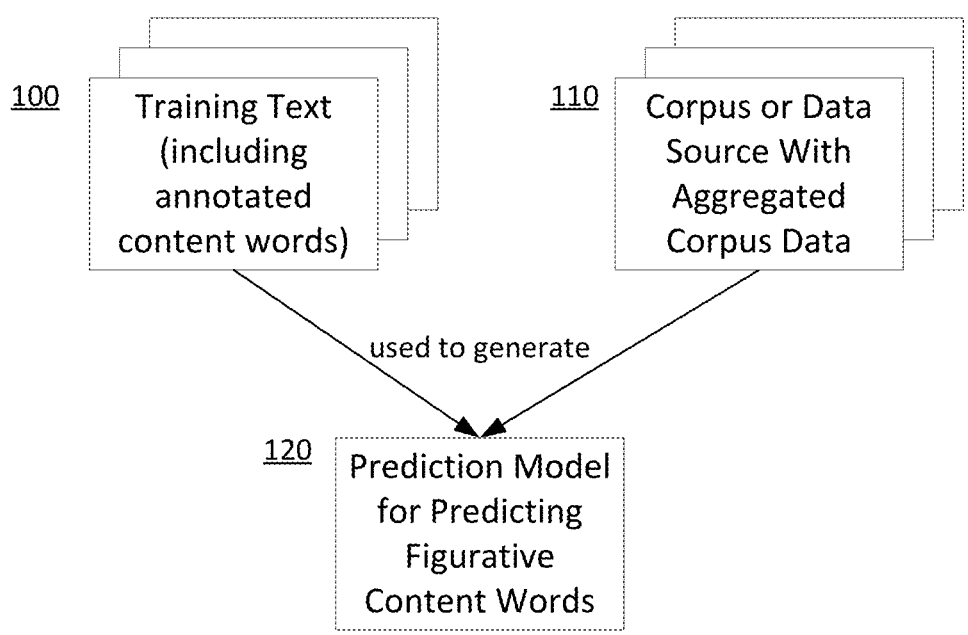
FIG. 1A is a block diagram depicting generation of a figure-of-speech prediction model for predicting figurative content words.

FIG. 1A is a block diagram depicting an embodiment for generating a figure-of-speech prediction model. Supervised learning may based on any number of training texts 100 (e.g., 55, 233, 1000, or more training texts), such as constructed responses, essays, articles, publications, and/or the like. The training texts 100 and target texts intended to be evaluated by the prediction model may be related to the same or similar topics (e.g., they may all be constructed responses generated by individuals in response to similar writing prompts). Alternatively, the training texts 100 may include texts that are dissimilar or unrelated to the target texts. Each training text 100 includes content words (i.e., nouns, most verbs, adjectives, and adverbs that refer to some object, action, or characteristic) and function words. The content words may be annotated (e.g., by human readers) to indicate whether they are being used figuratively. In one embodiment, a content word may be annotated as being figurative even if it is only figurative through reference (e.g., in the metaphor, "as the weather broke up, so did their friendship," the word "did" may be marked as being figurative). In one embodiment, each content word may have multiple annotations regarding its figurative classification (e.g., different annotations may be provided by different readers). In another embodiment, an annotation for a content word may be an aggregated value (e.g., an average) or union of several readers' annotations. Content words in the training texts 100 may be analyzed to extract certain features, which would be described in detail below. For some feature extraction methods, a corpus 110 may be used (e.g., the New York Times corpus, Gigaword corpus, and/or the like). In addition, data from certain corpuses may be extracted and aggregated to generate a data source 110 where aggregated or statistical information may be made readily available for look-up. For example, a data source 110 may include statistical information on how frequently a word is used figuratively in a corpus. The training texts 100 and the corpuses/data sources 110 may be used to generate a prediction model 120 for predicting whether an observed word is being used figuratively.

Figure 1B:
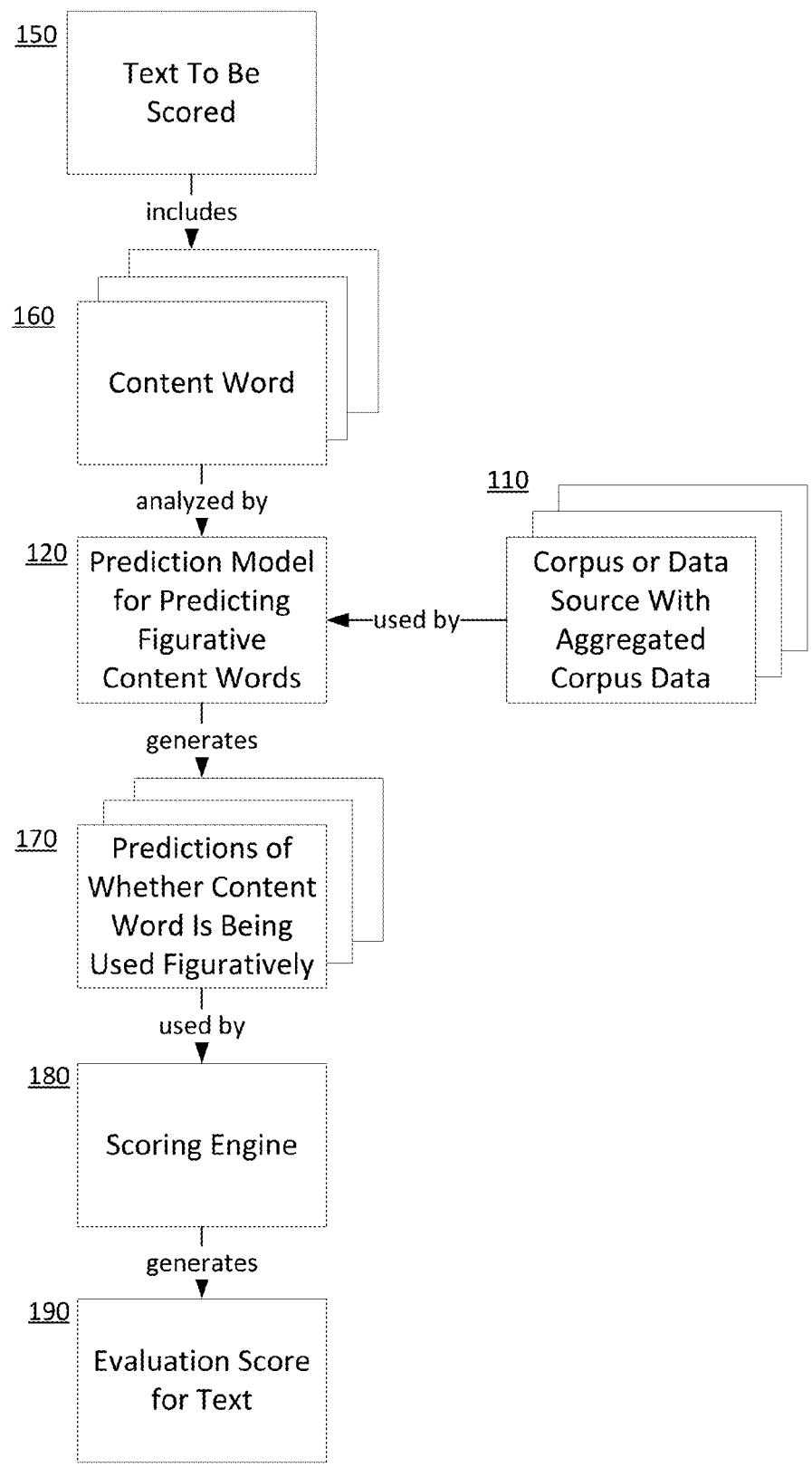
FIG. 1B is a block diagram depicting a figure-of-speech prediction model being used in scoring/evaluating a text.

FIG. 1B is a block diagram depicting a figure-of-speech prediction model 120 being used to score/evaluate a text 150. The text 150 to be scored may include content words 160, which are nouns, most verbs, adjectives, and adverbs. The content words 160 may be automatically detected using any conventional part-of-speech (POS) tagger, such as Stanford's Part-of-Speech tagger 3.0 and the University of Pennsylvania's full Penn Treebank tag-set. The POS tagger may, for example, parse the text to identify individual words (e.g., as unigrams, bigrams, n-grams, etc.) and determine whether each observed word is a noun, verb, adjective, adverb, etc. In some embodiments, the POS tagger may specify a more specific tag, such as singular noun, plural noun, base-form verb, past tense verb, present participle verb, comparative adjective, superlative adjective, comparative adverb, superlative adverb, etc. Each content word 160 in the text to be scored 150 may be analyzed by the prediction model 120. In some embodiments, the prediction model may cause various features, as described below (e.g., topic model feature, unigram feature, part-of-speech feature, etc.), to be extracted from the content word 160 using corpuses or data sources 110. The prediction model 120 may analyze the extracted features and transform them into a prediction 170 of whether the content word 160 is being used figuratively (e.g., metaphorically) or not. The prediction 170 in some embodiments may be a binary value (e.g., a value of 1 indicates that the content word is being used figuratively, and 0 indicates that it is not), a real number (e.g., which may reflect the prediction model's 120 confidence in its prediction), and/or the like. The result of the prediction model 170 may, in some embodiments, be analyzed by a scoring engine 180 and transformed into an evaluation score 190 for the text 150. For example, one of the features influencing the scoring engine 180's evaluation may be the proportion of figurative words to non-figurative words in the text 150. Of course, scoring engine 180 may be influenced by other features as well, such as spelling, grammar, sentence structure, etc.

Figure 2:
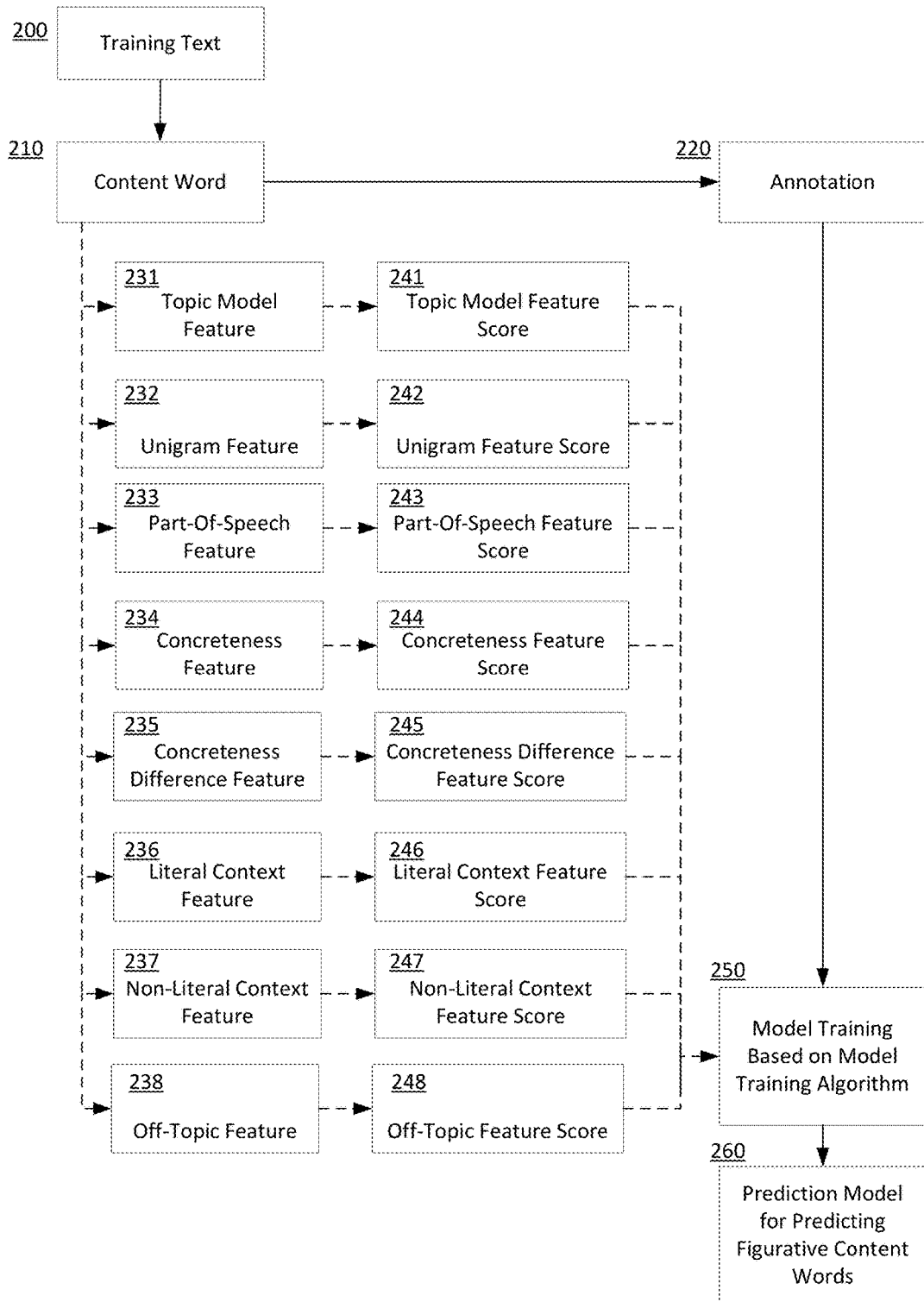
FIG. 2 is a flow diagram depicting a computer-implemented method of generating a figure-of-speech prediction model based on a variety of features.

FIG. 2 is a flow diagram depicting a computer-implemented method of generating a figure-of-speech prediction model based on a variety of features. As indicated above with respect to FIG. 1A, a collection of training texts may be used to train the prediction model. Each training text 200 may include any number of content words. Each instance of a content word 210 may be analyzed to derive scores for features that may be indicative of whether the content word 210 is being used figuratively or not. For example, a topic model feature 231 may be extracted from the content word 210 to derive a topic model feature score 241; a unigram feature 232 may be extracted to derive a unigram feature score 242; a part-of-speech feature 233 may be extracted to derive a part-of-speech feature score 243; a concreteness feature 234 may be extracted to derive a concreteness feature score 244; a concreteness difference feature 235 may be extracted to derive a concreteness difference feature score 245; a literal context feature 236 may be extracted to derive a literal context feature score 246; a non-literal context feature 237 may be extracted to derive a non-literal context feature score 247; and an off-topic feature 238 may be extracted to derive an off-topic feature score 248. Each of these features is described in detail below. Any combination of these features—as well as additional features—may be used to train 250 the figure-of-speech prediction model 260.

Embodiments for model training will now be described. The prediction model 260 may be represented by a mathematical relationship between a set of independent variables and a set of dependent variables. For example, the mathematical framework could employ a linear model, such as:

$$\text{Prediction} = a_0 + a_1 \cdot V_1 + a_2 \cdot V_2 + a_3 \cdot V_3 + a_4 \cdot V_4 + \ldots,$$

where Prediction is a dependent variable representing a prediction of whether a word is being used figuratively, each independent variable $V_i$ represents a feature score extracted from the word, and each associated $a_i$ represents a weighting coefficient. When training this model, the dependent variable "Prediction" may be replaced by the content word's 210 annotation 220, and the independent variables $V_i$ may be replaced by the extracted feature scores (e.g., labels 241-248). Naturally, the prediction model is not limited to a linear model, but could be any model, such as a logarithmic model. More generally, the prediction model may be represented by any suitable function F of the weighting coefficients $a_i$ and the variables $V_i$, i.e.:

$$\text{Prediction} = F(a_i, V_i)$$

The choice of the particular mathematical framework for the model in this regard is within the purview of one of ordinary skill in the art. In exemplary work conducted by the present inventors, a logarithmic framework was used for the prediction model.

Based on the type of prediction model utilized, any suitable conventional model training algorithm 250 may be used to determine the coefficients $a_i$ for the associated variable $V_i$. For example, logistic regression may be used with a logarithmic modeling framework and linear regression may be used with a linear modeling framework. In one embodiment, a logistic regression classifier implemented in the Scikit-Learn package may be used (e.g., training may be optimized for the F1 score, where a word is classified to be a figure-of-speech). Through the use of the model training algorithm, the extracted features scores (e.g., labels 241-248) may be transformed into weighting coefficients (e.g., a) for the model, which may then be used by a machine to automatically predict whether observed words are being used figuratively or literally.

During model training 250, one consideration is whether precision (i.e., proportion of predicted figurative content words that are in fact figurative) or recall (i.e., proportion of figurative content words in the text that are detected/predicted) is more important. Given that the target class of interest (i.e., figurative words) is a minority class (e.g., figurative words may be less than 12% of the data), a machine learning algorithm may be excessively conservative due to low overall frequency of the target class. A training algorithm that overly penalizes false positives or require overly high confidence level to make a positive prediction (i.e., that a word is being used figuratively) may result in a prediction model that has high precision but low recall, which may sometimes be undesirable. To increase recall, in one embodiment instances of figurative words in the data set may be increased such that the distribution of figurative versus literal words may be more balanced. In another embodiment, the training algorithm may be adjusted by assigning penalty weights that are inversely proportional to class frequencies. For example, given that the proportion of figurative words is typically low, a higher penalty weight may be assigned to increase the significance of missed predictions of figurative words. For example, rather than using a training algorithm that counts every type of error as 1, the system may use a training algorithm that assigns 1 penalty weight to each false positive (i.e., mistakenly predicting/classifying a non-figurative word as figurative) and 3 penalty weights to each false negative (i.e., mistakenly predicting/classifying a figurative word as non-figurative). By adjusting the relative penalty weights in this manner, it has been observed that the resulting prediction model has improved recall but with less precision. Thus, depending on the desired precision versus recall characteristics, the relative penalty weights for false positives and false negatives may be adjusted.

Figure 3A:
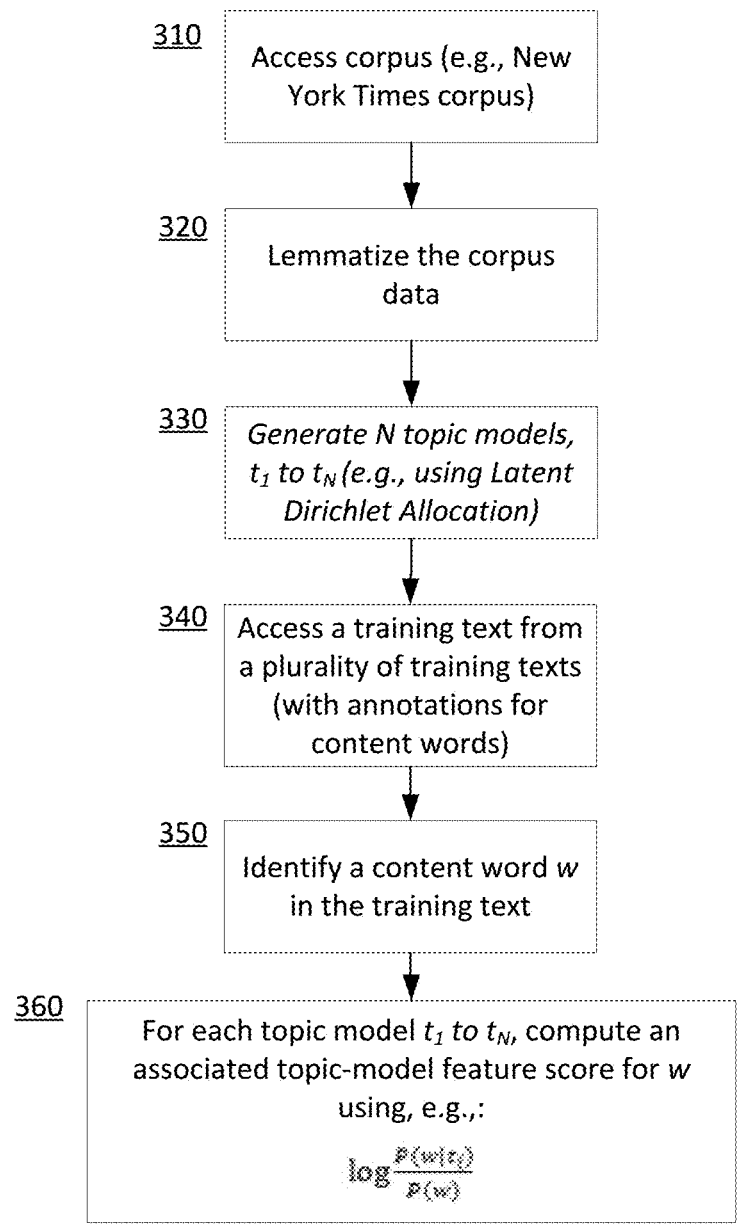
FIG. 3A is a flow diagram depicting a computer-implemented method of extracting topic model feature scores for a content word.

FIG. 3A is a flow diagram depicting a computer-implemented method of extracting topic model feature scores for a content word. The topic model feature is based on the observation that words frequently used in certain topics may rarely be used in other topics. For example, the word "rebound" may frequently occur in sports topics, but it may rarely occur in others. Thus, when the word "rebound" occurs in a non-sports topic, there is an increased likelihood that it is being used figuratively. Given that essay topics typically form a restricted set of general topics (e.g., essay topics typically do not include culture-specific and knowledge-intensive topics, such as sports and architecture), if a word in an essay is typically observed to occur in a small set of general topics, then it is more likely that the word is being used figuratively.

The topic model feature is designed to capitalize on the above observations. General topics may be automatically derived from a corpus that represents common topics of public discussion, such as the New York Times 310. The New York Times data may be lemmatized 320 (e.g., the words "walked," "walks," "walking" may all be transformed to the lemma form, "walk"). An algorithm may analyze the New York Times data to derive a predetermined number (e.g., 100, 150, or any other number) of topic models 330 to represent common topics $t_1$ to $t_n$ of public discussion. In one embodiment, the topic models may be derived using Latent Dirichlet Allocation or any other generative models. Latent Dirichlet Allocation in one embodiment may be implemented by the gensim toolkit, which may be used to generate the topic models using the toolkit's default parameters. Each of the derived topic models provides word distribution information.

The generated N topic models for topics $t_1$ to $t_n$ may be used to extract topic model feature scores for each content word in the training texts. An algorithm may access a training text from the collection of training texts 340 and identify a content word w 350. In one embodiment, the content word may be identified based on its part-of-speech, which may be automatically determined by a conventional Part-Of-Speech tagger as described above. The algorithm may use the N topic models for topics $t_1$ to $t_n$ and transform them into topic-model feature scores 360 for content word w, based on the formula, e.g.:

$$\log \frac{P(w|t_i)}{P(w)},$$

where $P(w|t_i)$ represents the probability of the content word w appearing in topic $t_i$ based on the topic model representing topic $t_i$, and P(w) represents the probability of the content word w occurring in a text (regardless of topic). P(w) may be estimated using the same New York Times corpus or any other corpus (e.g., the Gigaword corpus, which provides word frequency measures). The log is used in some embodiments to lessen the significance of extreme values. In some embodiments, the log may be omitted, i.e., the above formula could be replaced with, the following formula, e.g.:

$$\frac{P(w|t_i)}{P(w)}.$$

In some embodiments, each content word may have N topic-model feature scores, each of which corresponding to one of the N topic models. In another embodiment, the N topic-model feature scores may be aggregated (e.g., averaged, the maximum value selected, etc.) and used in model training. As described with respect to FIG. 2, the topic-model feature scores 241 (or the corresponding aggregated value) for each content word 210, along with the content word's figure-of-speech annotation 220, may be used to train 250 the prediction model 260.

Figure 3B:
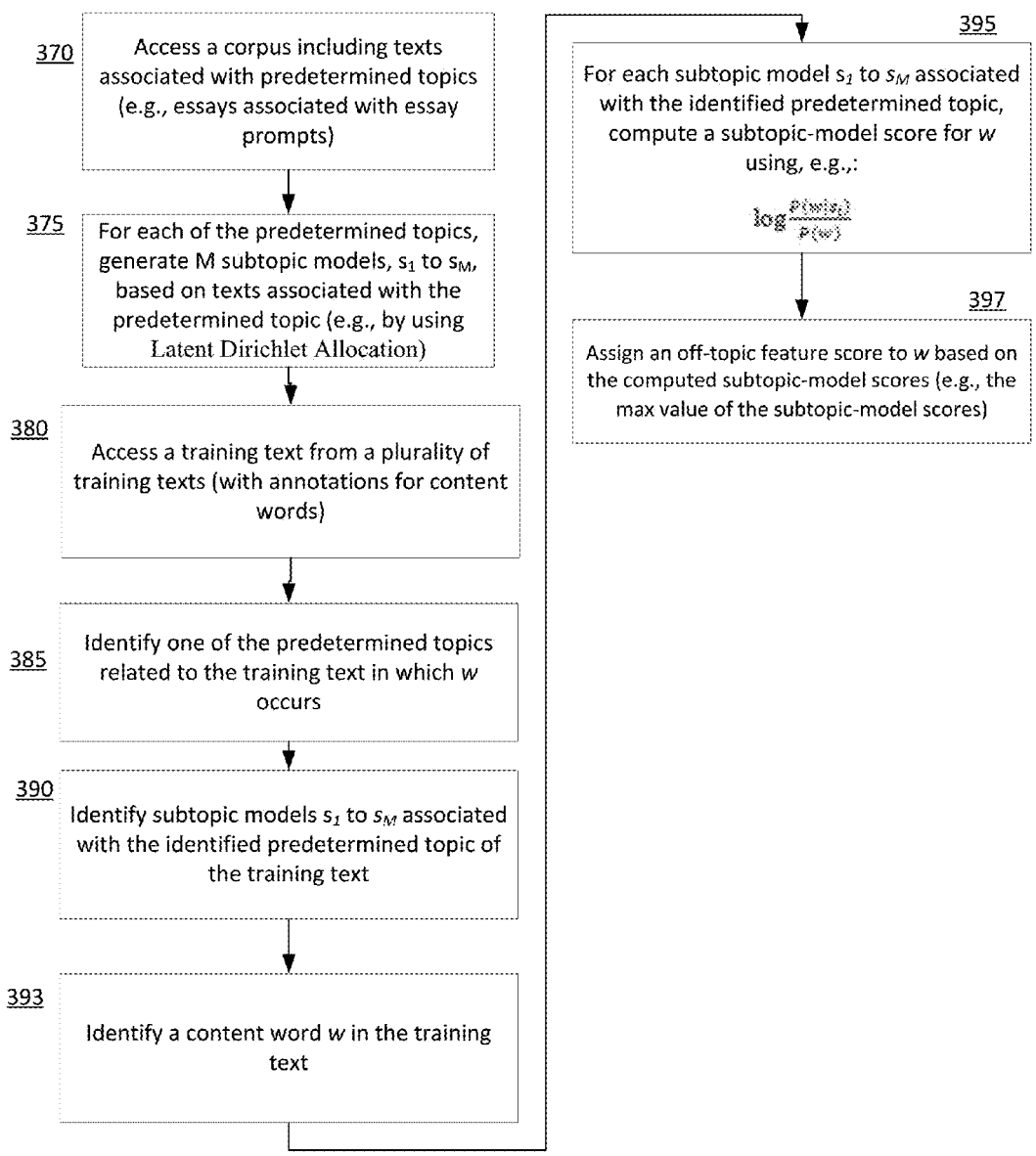
FIG. 3B is a flow diagram depicting a computer-implemented method of extracting an off-topic feature score for a content word.

FIG. 3B is a flow diagram depicting a computer-implemented method of extracting an off-topic feature score for a content word. The off-topic feature is based on the intuition that when a word that does not commonly occur in a given topic (in other words, off topic) is in fact observed in that topic, the word is more likely being used figuratively. For example, if the word wreck appears under a sporting topic, it is more likely that it is being used figuratively (e.g., "This team is a wreck."). One way to determine whether a word is off topic is by analyzing how common the word appears in each of that topic's subtopics. The word wreck, for example, may not be common in any sports subtopic, such as basketball, football, tennis, etc., and is therefore likely an off-topic word. The word team, on the other hand, may commonly appear in many sports subtopics, and therefore is not likely an off-topic word. The off-topic feature model is designed to capitalize on these observations.

In some embodiments of the off-topic feature, it may be desirable to pre-generate subtopic models for a set of predetermined topics. An algorithm for generating the subtopics may access a corpus that includes texts associated with predetermined topics 370 (e.g., a collection of constructed essays written in response to predetermined essay prompts). In some implementations, words in the corpus may be lemmatized. For each topic, the algorithm may identify a collection of texts in the corpus associated with that topic (e.g., by issuing a query for all texts having a particular topic ID) and use them to generate a predetermined number (e.g., 50, 222, or any other number) of M subtopic models 375 $s_1$ to $s_M$. In one embodiment, the subtopic models may be derived using Latent Dirichlet Allocation or any other generative models, as described above with respect to topic model generation. Each of the derived subtopic models provides word distribution information that may be used during off-topic feature extractions.

During off-topic feature extraction, an algorithm may automatically access a training text from a collection of training texts 380 and identify the topic to which the training text relates 385 (e.g., the topic may be an essay prompt or an associated topic ID). Based on the identified topic, the algorithm may identify the associated subtopic models $s_1$ to $s_M$ 390. Then for each content word w in the training text 393 (identified using, e.g., POS tags), the algorithm may compute M subtopic-model scores 395. Each of the subtopic model scores may be computed based on a subtopic model using the formula, e.g.:

$$\log\frac{P(w|s_i)}{P(w)},$$

where $P(w|s_i)$ represents the probability of the content word w appearing in subtopic $s_i$, and P(w) represents the probability of the content word w occurring in the more general topic. $P(w|s_i)$ may be computed using subtopic $s_i$'s corresponding subtopic model, and P(w) may be estimated using a collection of texts related to the more general topic. The formula above uses log to lessen the significance of extreme values. The log may be omitted in other embodiments such that the above formula could be replaced with, e.g., the following:

$$\frac{P(w|s_i)}{P(w)}.$$

The algorithm may transform the computed subtopic-model scores into an off-topic feature score 397. In some embodiments, the off-topic feature score may be set to the highest subtopic-model score. In other embodiments, the off-topic feature score may be a vector of the subtopic-model scores. In yet another embodiment, the off-topic feature score may be an aggregated value of the subtopic-model scores (e.g., the average, sum, etc.). As described above, the off-topic feature score for each content word in the training texts may be used to train the prediction model for predicting figurative words (e.g., the off-topic feature score may be used as data point values for independent variables in the model, and the associated content word's annotation, such as whether the content word is being used figuratively, may be used as a value for the dependent variable).

Figure 4:
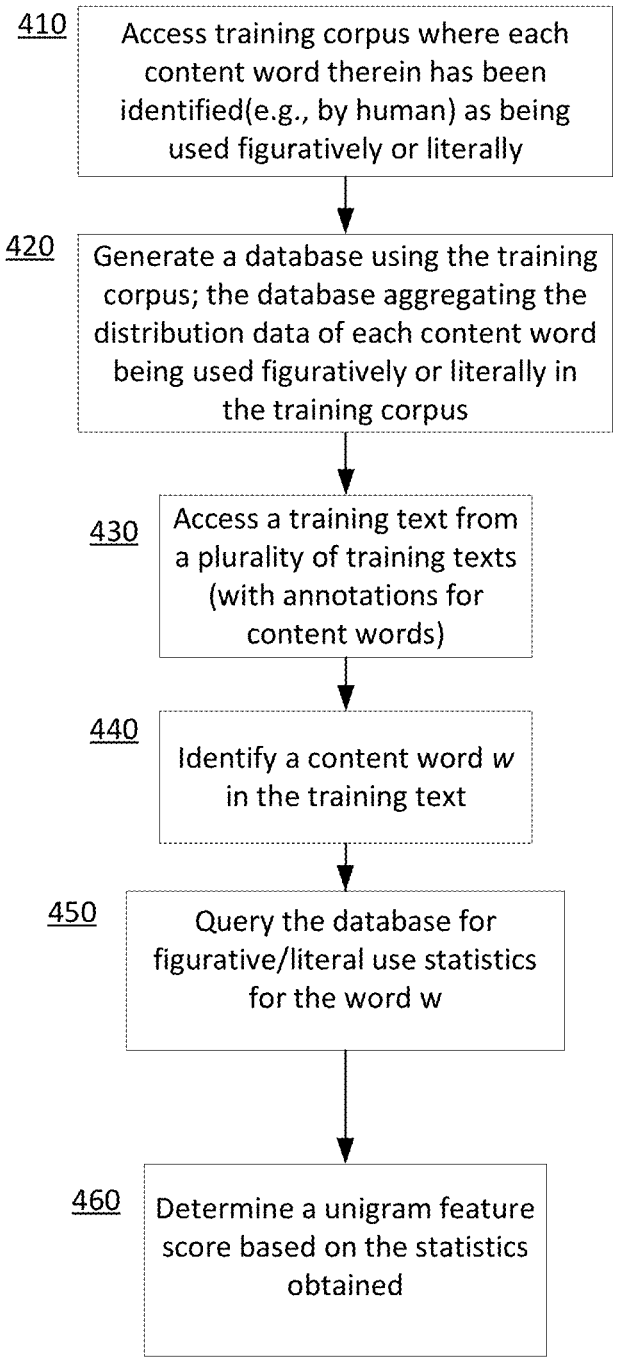
FIG. 4 is a flow diagram depicting a computer-implemented method of extracting a unigram feature score for a content word.

FIG. 4 is a flow diagram depicting a computer-implemented method of extracting a unigram feature score for a content word. The unigram feature is based on the intuition that words that are commonly used figuratively may more likely to be used figuratively in the observed instances. For example, the word "sea," which is often used in figurative expressions (e.g., "sea of love," "sea of people," "sea of fire," etc.) may be more likely to be used figuratively than words that are rarely used figuratively (e.g., "lake" and "pond"). In some embodiments, it may be desirable to create a database that contains statistical information on the frequency in which particular words are used figuratively in a corpus (e.g., statistical information may be a number or percentage of observed instances where a word is used figuratively). The database may be generated based on a training corpus where each content word therein has been annotated (e.g., by human reviewers) as being figurative or literal 410. In one embodiment, all content words in the training corpus are used to generate the database, without stemming or lemmatization. In another embodiment, the content words may undergo stemming or lemmatization. Based on the annotations, statistical information on each content word's figurative and/or literal use distribution may be computed and stored in the database. In some embodiments where the training corpus includes known topics (e.g., the training corpus may be constructed written responses to essay topic prompts), data in the database may be further filtered based on the desired topic(s). For example, if a user is interested in knowing how frequently a particular word is used figuratively in a particular topic, the user may query the database to return statistical information for that word based only on training corpus data associated with that topic. In some implementations, the database may include entities that represent observed words in the training corpus, where each entity includes the observed word, its annotation (i.e., figurative or not), and the topic under which the word occurs. The database provides means to quickly look up statistical information for words during unigram feature extraction.

When extracting the unigram feature for a content word, an algorithm may access a training text 430 and identify a content word therein based on, e.g., part-of-speech tags as described above. The above-described database may then be queried 450 to obtain statistical information on how frequently the identified content word has been used figuratively in the training corpus. For example, the database may return 10% for the word sea to indicate that sea was used figuratively in 10% of the observed instances, and 0.1% for the word lake. The algorithm may then transform this statistical information to determine a unigram feature score 460 for the content word. For example, if the statistical information obtained is a percentage value, it could simply be used as the unigram feature score 460. As another example, if the statistical information is a count of figurative uses or a distribution of figurative/literal uses, the unigram feature score 460 may be calculated based on such information to derive a representative value. As described above, the unigram feature score for each content word in the training texts may be used to train the prediction model for predicting figurative words (e.g., the unigram feature score may be used as a data point value for an independent variable in the model, and the associated content word's annotation, such as whether the content word is being used figuratively, may be used as a value for the dependent variable).

Figure 5:
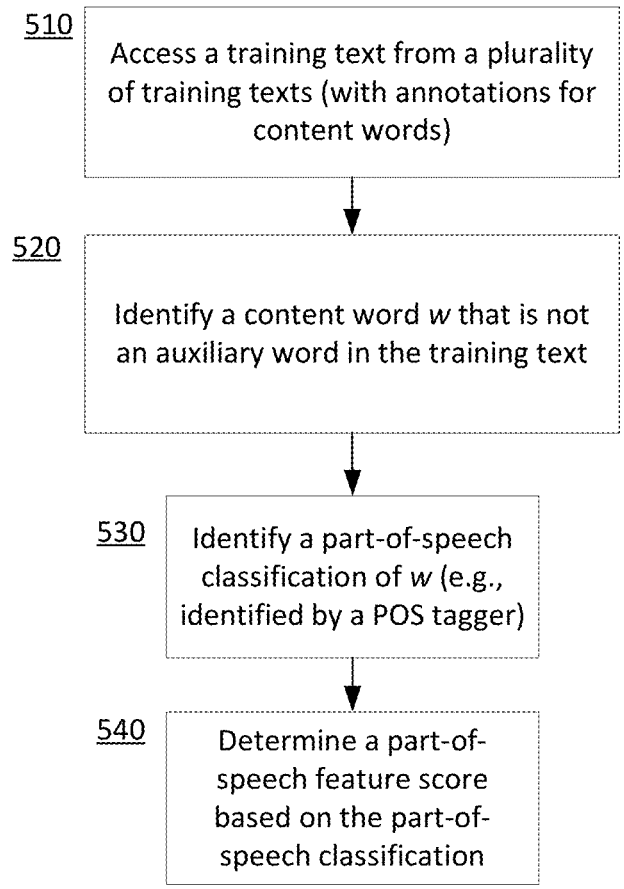
FIG. 5 is a flow diagram depicting a computer-implemented method of extracting a part-of-speech feature score for a content word.

FIG. 5 is a flow diagram depicting a computer-implemented method of extracting a part-of-speech feature score for a content word. The part-of-speech feature is based on the observation that certain words are more likely to be figurative if they are in certain parts-of-speech. For example, the noun "ballpark" may typically be used figuratively in the singular form (e.g., "ballpark figure") but not in the plural form (e.g., "visiting three ballparks"). As another example, the word "melting" may more likely be used figuratively as an adjective (e.g., "melting pot") than as a verb (e.g., "the sun is melting the snow"). Extracting the part-of-speech feature entails identifying the part-of-speech of the observed word.

When extracting the part-of-speech feature, an algorithm may accessed a training text 510 and identify a content word therein 520. In some embodiments, auxiliary words may be ignored (e.g., have, be, do). The part-of-speech classification of the content word may then be identified 530 by using, e.g., Stanford's Part-of-Speech tagger 3.0 and the University of Pennsylvania's full Penn Treebank tag-set for nouns, verbs, adjectives, and adverbs (e.g., tags starting with N, V, J, A, respectively). In some embodiments, the part-of-speech tags may include fine-grain classifications (e.g., verbs may be further classified into present tense, past tense, infinitive; nouns may be further classified into singular, plural, etc.). Part-of-Speech tagging may be performed on the fly or preprocessed (i.e., the words in the training texts may be tagged prior to feature extraction). The part-of-speech tag classification may then be transformed into a part-of-speech feature score for the content word 540. In one embodiment, the feature score may include a plurality of binary values, each representing a predetermined part-of-speech classification. For example, if four binary values represent noun, verb, adjective, and adverb, respectively, a part-of-speech feature score of 0, 0, 1, 0 would mean that the content word is classified as an adjective. In another embodiment, the values representing the parts-of-speech may be confidence scores generated by the part-of-speech tagger. Continuing the above example, a part-of-speech feature score of 0, 0.2, 0.5, 0 would indicate that the part-of-speech tagger is 20% confident that the word is a verb and 50% confident that the word is an adjective. As described above, the part-of-speech feature score for each content word in the training texts may be used to train the prediction model for predicting figurative words (e.g., the part-of-speech feature score may be used as data point values for independent variables in the model, and the associated content word's annotation, such as whether the content word is being used figuratively, may be used as a value for the dependent variable).

Figure 6:
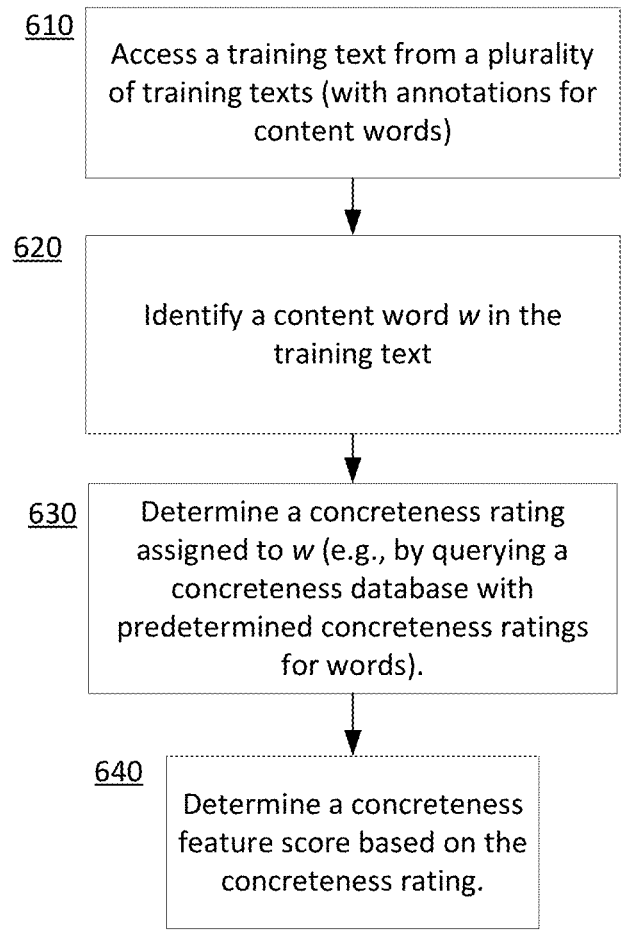
FIG. 6 is a flow diagram depicting a computer-implemented method of extracting a concreteness feature score for a content word.

FIG. 6 is a flow diagram depicting a computer-implemented method of extracting a concreteness feature score for a content word. The concreteness feature is based on the observation that metaphors (and other forms of figure-of-speech) often use words that describe concrete, real-world things to describe abstract ideas. For example, the word ballpark is a concrete word used to describe the abstract idea of a rough estimate. Thus, concrete words may more likely be used figuratively than abstract words. One way to determine a word's degree of concreteness is to ask a collection of people to rate the concreteness of the word on a scale (e.g., 1-5), and then compute an average rating based on the responses given. Alternatively, the inventors have utilized a concreteness ratings database (e.g., by Marc Brysbaert of Ghent University), which provides predetermined concreteness ratings for 40,000 generally known English word lemmas, to determine the concreteness rating of words. During concreteness feature extraction, a training text may be accessed 610 and a content word therein may be identified 620. The content word may be looked up in the concreteness ratings database, which may return a predetermined concreteness rating 630 for the content word. The obtained concreteness rating may then be transformed into a concreteness feature score 640. In one embodiment, the concreteness feature score may simply be the concreteness rating obtained.

In another embodiment, the concreteness feature score may be binary values corresponding to a predefined plurality of bins. Each bin may be associated with a concreteness rating range, and the collective concreteness rating ranges of the plurality of bins may cover the entire range of possible concreteness ratings (e.g., 1-5). For example, bin #1 may be associated with a concreteness rating range of 1 to 1.24; bin #2 may be associated with a concreteness rating range of 1.25 to 1.50; bin #3 may be associated with a concreteness rating range of 1.51 to 1.75; and so on. In this example the range increment for the bins is 0.25, but in general the bins may be assigned any concreteness rating ranges. Depending on the predetermined concreteness rating from the concreteness ratings database (e.g., at 630 in FIG. 6), a corresponding bin would be selected. Specifically, the bin which has an associated concreteness rating range that encompasses the predetermined concreteness rating would be selected. For example, using the concreteness rating ranges provided above, if the predetermined concreteness rating for the content word is 1.4, bin #2 would be selected. The concreteness feature score for the content word may be based on the bin selection. For example, if there are a total of five bins, and the second bin is selected, the concreteness feature score may be a vector of 0, 1, 0, 0, 0, where the "1" designates that the second bin is selected. In one embodiment, the bins would not have over-lapping concreteness rating ranges, which means only one bin would be selected for every content word.

In another embodiment, bin may be associated with non-mutually exclusive concreteness rating conditions. For example, bin #1's condition may require at least a concreteness rating of 1, bin #2's condition may require at least a concreteness rating of 2, bin #3's condition may require at least a concreteness rating of 3, and so on. If the predetermined concreteness rating obtained from the concreteness ratings database is 2.4, for example, bin #1 and bin #2's conditions would be satisfied, but not bin #3's condition. Thus, bin #1 and bin #2 would be selected, but not bin #3 or any of the other bins with greater threshold conditions (if the condition pattern continues for additional bins). In this case, the concreteness feature score may be 1, 1, 0, . . . 0, where the two 1's indicate that the conditions for bins #1 and #2 are satisfied, and the 0's indicate that the conditions for bins #3 and above are not satisfied. In other embodiments, the concreteness rating conditions for the bins may be open-end in the other direction, e.g., bin #1 requires a concreteness rating of at most 1, bin #2 requires a concreteness rating of at most 2, bin #3 requires a concreteness rating of at most 3, and so on. Thus, in the above example where the predetermined concreteness rating for a content word is 2.4, the feature score may be 0, 0, 1, . . . 1, where the two 0's indicate that the conditions for bins #1 and #2 are not satisfied, and the 1's indicate that the conditions for bins #3 and above are satisfied (assuming that the remainder bins have greater threshold conditions). In yet another embodiment, both sets of open-ended bins as described above may be used. Continuing with the previous example where the predetermined concreteness rating is 2.4, the concreteness feature scores may then be 1, 1, 0, . . . 0 and 0, 0, 1, . . . 1. As described above, the concreteness feature scores for each content word in the training texts may be used to train the prediction model for predicting figurative words (e.g., the concreteness feature scores may be used as data point values for independent variables in the model, and the associated content word's annotation, such as whether the content word is being used figuratively, may be used as a value for the dependent variable).

Figure 7:
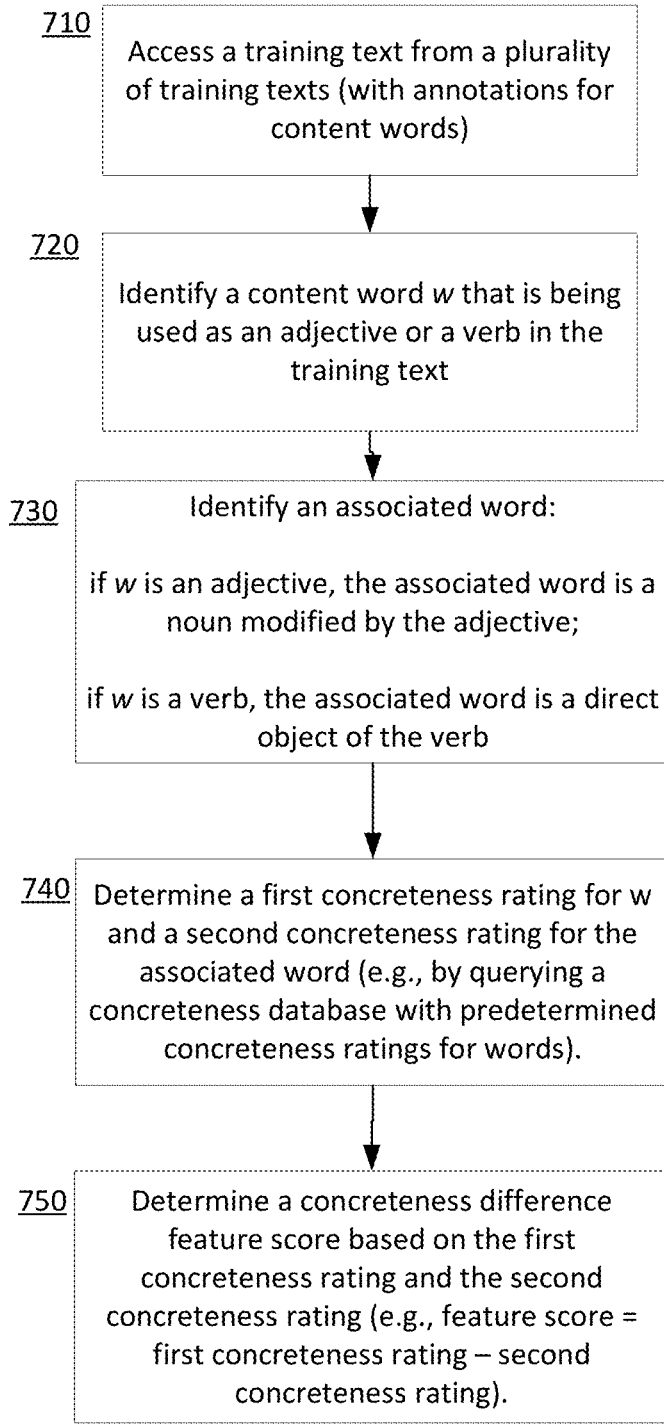
FIG. 7 is a flow diagram depicting a computer-implemented method of extracting a concreteness difference feature score for a content word.

FIG. 7 is a flow diagram depicting a computer-implemented method of extracting a concreteness difference feature score for a content word. In general, the concreteness difference feature is based on the observation that in situations where a concrete adjective or verb is applied to an abstract noun, the adjective/verb is often figurative (e.g., dark in "dark though," pour in "pour ideas," and blue in "blue revolution" are used figuratively). During feature extraction, a training text is accessed from storage (e.g., hard drive or memory) 710. In one embodiment, each content word in the training text is analyzed to identify those that are adjectives or verbs (e.g., by using part-of-speech tags as described above) 720. After an adjective or verb content word has been identified, the next step is to identify an associated word 730. If the content word is an adjective, the associated word refers to the noun modified by the adjective; if the content word is a verb, the associated word refers to the direct object of the verb. Concreteness ratings for the content word and the associated word are then determined by, e.g., using the concreteness ratings database described above 740. The content word's concreteness rating and the associated word's concreteness rating may then be transformed into a concreteness difference feature score 750. In some implementations, the concreteness difference feature score is the difference between the content word's concreteness rating and the associated word's concreteness rating. For example, if the content word has a concreteness rating of 4.2 on a scale of 1-5 (the higher the number, the more concrete), and the associated word has a concreteness rating of 2.0, the concreteness difference feature score would be: 4.2-2.0=2.2. In some implementations, the concreteness rating feature score is only calculated and used if the associated word is sufficiently abstract (e.g., it has a concreteness rating of at least 3).

As with the concreteness feature described above, the concreteness difference feature score may be based on binary bins or open-ended bins with threshold conditions. As described above, the binary bins may each correspond to a concreteness difference range. For example, bin #1 may be associated with a concreteness difference range of 1 to 1.24; bin #2 may be associated with a concreteness difference range of 1.25 to 1.49; and so on, with bin #5 being associated with a concreteness difference range of 2 to 2.24. Using the above example where the concreteness difference is 2.2, only bin #5 would fire. Thus, the concreteness difference feature score may be 0, 0, 0, 0, 1, 0, . . . 0. Also as described above, open-ended bins with threshold conditions may be used. For example, bin #1 may require a concreteness difference of at most 1, bin #2 may require a concreteness difference of at most 2, bin #3 may require a concreteness difference of at most 3, and so on. Thus, with a concreteness difference of 2.2, bins #1 and #2 would each be 0 (not firing), and bins #3 and above, if the pattern continues, would each be 1 (firing). Alternatively, the open-ended bins may reverse in direction: e.g., bin #1 may require a concreteness difference of at least 1, bin #2 may require a concreteness difference of at least 2, bin #3 may require a concreteness difference of at least 3, and so on. Thus, a concreteness difference of 2.2 would cause bins #1 and #2 to fire, and bins #3 and above would not fire. In yet another embodiment, any combination of the above described bins (e.g., binary bins and the open-ended bins in either direction) may be used. As described above, the concreteness difference feature scores for each content word in the training texts may be used to train the prediction model for predicting figurative words (e.g., the concreteness difference feature scores may be used as data point values for independent variables in the model, and the associated content word's annotation, such as whether the content word is being used figuratively, may be used as a value for the dependent variable).

Figure 8:
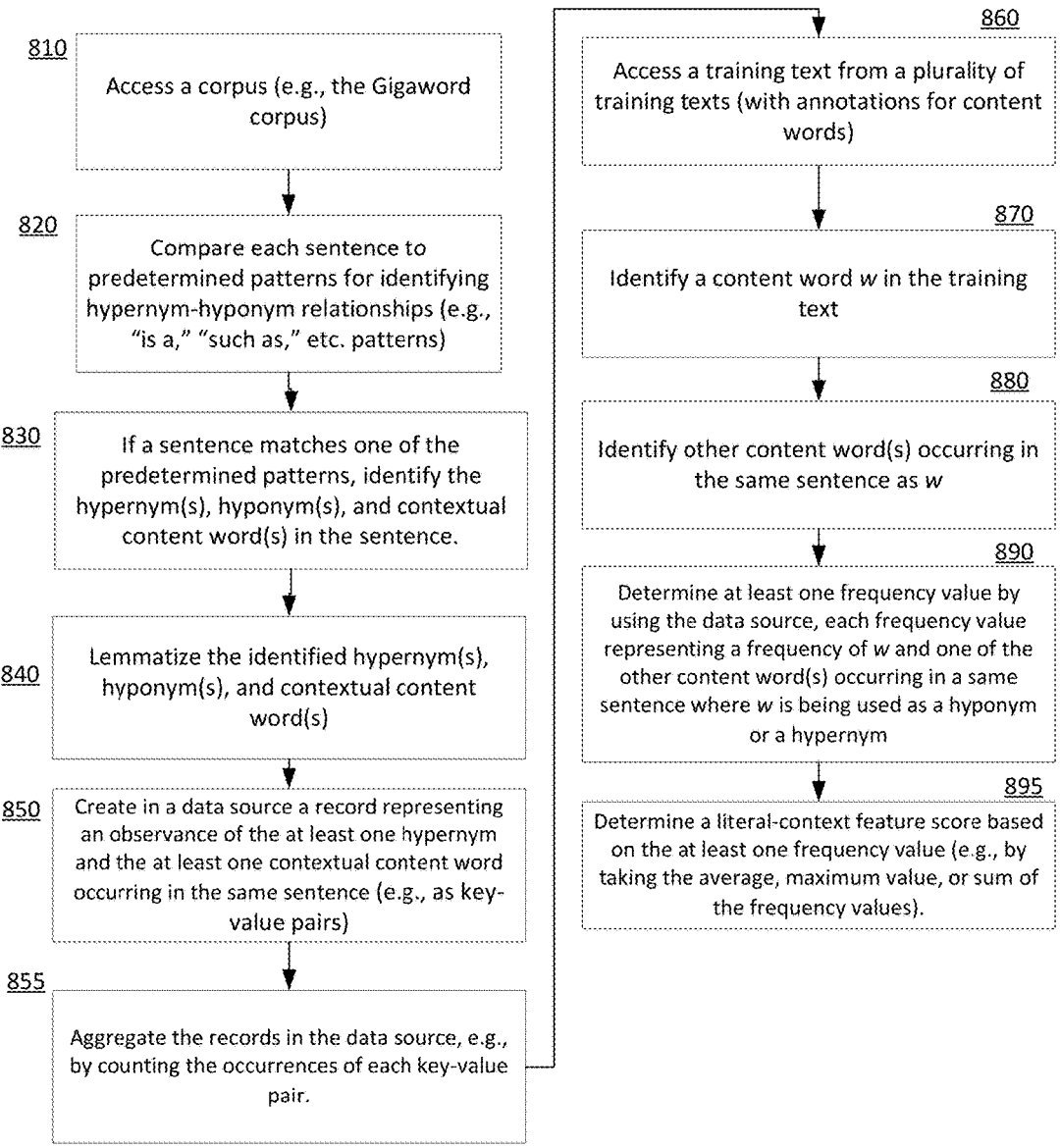
FIG. 8 is a flow diagram depicting a computer-implemented method of extracting a literal-context feature score for a content word.

FIG. 8 is a flow diagram depicting a computer-implemented method of extracting a literal-context feature score for a content word. In a sentence that includes a hypernym-hyponym expression—such as "fruit such as pears" in "Fruit such as pears are nutritious and healthy"—the expression is likely literal. Given that the expression is likely literal, the sentential context of the expression—namely the other content words—may serve as witnesses to the likely literal use of the hypernym (e.g., fruit) and hyponym (e.g., pear). The intuition is that fruit or pear is likely to be used literally if nutritious or healthy appears in its vicinity (e.g., in "I am surprised you do not like pears—they are both tasty and nutritious," the word pear is likely being used literally since the sentence also includes nutritious).

In one embodiment, it may be desirable to create a database/data source that captures literal-use witnesses, as described above, for hypernyms/hyponyms. The database may be generated by accessing and analyzing a corpus, such as the Gigaword corpus 810. An algorithm may be used to automatically detect hypernym-hyponym relationships in sentences found in the corpus 820. In one embodiment, the algorithm may compare each sentence to predetermined patterns for identifying hypernym-hyponym relationships. Examples of the pattern include, but are not limited to:

"such as" pattern—e.g., automakers such as Toyota; politicians such as John Smith "such X as Y" pattern—e.g., such countries as Korea and Japan "and/or other" pattern—e.g., bromide and other chemicals; butter or other ingredients "and/or Z other" pattern—e.g., squirrels, rabbits, and many other native animals; gravel or some other solid fillers If a sentence matches one of the predetermined patterns, the algorithm identifies the hypernym(s), hyponym(s), and sentential contextual content words (i.e., other content words in the sentence) in the sentence 830. As described above, the hypernym(s) and hyponym(s) are likely being used literally, and the contextual content words serve as witnesses to the their literal use. In some implementations, the identified hypernym(s), hyponym(s), and contextual content words may be lemmatized 840. In some implementations, the observed hypernym, hyponym, and contextual content words may be recorded 850 in a database. For instance, the identified words may be temporarily stored as key-value pair records, using each hypernym(s) and hyponym(s) as the key and each contextual content word as the corresponding value (e.g., if fruit is a hypernym, pear is a hyponym, and nutritious is a contextual content word, two key-value pairs may be store: fruit-nutritious and pear-nutritious). The records may then be aggregated 855 by, e.g., counting the occurrences of each key-value pair record. For example, the word fruit may be used 500 times in the corpus as a hypernym or a hyponym. When fruit is used as a hypernym, it may co-occur with contextual content word nutritious in the same sentence 23 times; when fruit is used as a hyponym, it may co-occur with nutritious in the same sentence 45 times. This information may be aggregated so that the data source may include a record indicating that the word fruit may have nutritious as its literal-use witness 23+45=68 times in the corpus.

In one embodiment, the data source may be used for information lookup during literal-context feature extraction. During an extraction process, an extraction algorithm may automatically accessed a training text from storage (e.g., hard drive or memory) 860 and identify a content word therein (e.g., based on the assigned part-of-speech tag) 870. Once the target content word has been identified, the algorithm may identify other content word(s) occurring in the same sentence 880. For example, in the sentence "Fruit such as pears are nutritious and healthy," if fruit is the target content word for which features are currently being extracted, then the other content words may be pear, nutritious, and healthy. For each of the other content words (e.g., pear), the algorithm may then determine a frequency of that content word occurring in the same sentence as the target content word, where the target content word is being used as a hypernym or hyponym 890. In one implementation, this may be done by querying the data source (e.g., generated at label 855 in FIG. 8) to look up the records associated with the target content word. In the example where the target content word is fruit and the other content word is nutritious, the data source may return a result indicating that nutritious is a literal-use witness for fruit X times (e.g., 68 times, continuing the example above). Similarly, the data source may return frequency values Y and Z for the two other content word, pear and healthy, respectively. One or more of the frequency values X, Y, and Z may then be transformed into a literal-context feature score for the target content word 895. For example, the literal-context feature score may be an average, maximum value, or sum of the X, Y, and Z frequency values, or any other predetermined metric to capture the strength of the literal-context witnesses. Any one of X, Y, and Z may be 0 if no matching record is found in the data source.

In some embodiments, the frequency values may be weighted to adjust for common, non-specific words (e.g., say, new, use, etc.) that frequently appear as witnesses to a large variety of other words. Such words are less reliable literal-context witnesses. In one implementation, Term Frequency-Inverse Document Frequency ("tf-idf"), known to persons of ordinary skill in the art, may be used. In general, the tf-idf value increases proportionally to the number of times a word appears in a document, but is offset by the frequency of the word in the corpus. When tf-idf is used in the literal-context feature context, a "document" is the collection of witnesses for a given content word. For example, if a literal-context witness occurs often with a target content word, it's term frequency (tf) may be large, but it may be offset by the inverse document frequency (idf) if the literal-context witness also occurs frequently with other words. For example, consider the metaphorical use of the word trash in the two sentences below:

1. Also, large amount of trash e-mails have impeded the efficient and effective communications in business realm.
2. Yet the over quantity of trash information such as advertisements impeded people's meaningful and thoughtful communications.

The other content words in the two sentences that have been observed to co-occur with trash in a sufficiently large corpus are as follows (the number in each parenthesis represents the observance count):

1a: large(3) business(3) effective(1)
2a: say(62) people(11) quantity(1)

Applying the tf weights would have yielded:

1b: large(0.010) business(0.010) effective(0.003)
2b: say(0.201) people(0.036) quantity(0.003)

The tf-idf values are as follows (note the reduced value for say):

1c: large(0.014) business(0.014) effective(0.008)
2c: say(0.101) people(0.036) quantity(0.011)

These are relatively weak literal-context witnesses, suggesting, correctly, that the use of trash might not be in line with the typical literal usage of the word and therefore may be used figuratively. As an additional example, consider the following figurative and literal uses of mother, respectively, and the witness vectors extracted for their contexts:

3. One can easily understand by demonstration and explaining things in one's own mother tongue rather than carrying tome's with them.
4. The same goes for the single mother or dad with children.

The witness vectors for the two cases, adjusted using tf-idf, are:

3a. one(0.056) own(0.026) carry(0.025) explain(0.015) thing(0.015) understand(0.003) demonstration(0.006)
4a. child(0.219) single(0.066) go(0.046) same(0.014) dad (0.003)

The literal-context witnesses in sentence 3 are all fairly weak, thus suggesting that the word mother is being used figuratively. In contrast, the literal-context witness word child is fairly strong based on its 0.219 weighted value. This correctly suggests that the word mother is being used literally in sentence 4. As described above, the literal-context feature scores for each content word in the training texts may be used to train the prediction model for predicting figurative words (e.g., the literal-context feature scores may be used as data point values for independent variables in the model, and the associated content word's annotation, such as whether the content word is being used figuratively, may be used as a value for the dependent variable).

Figure 9:
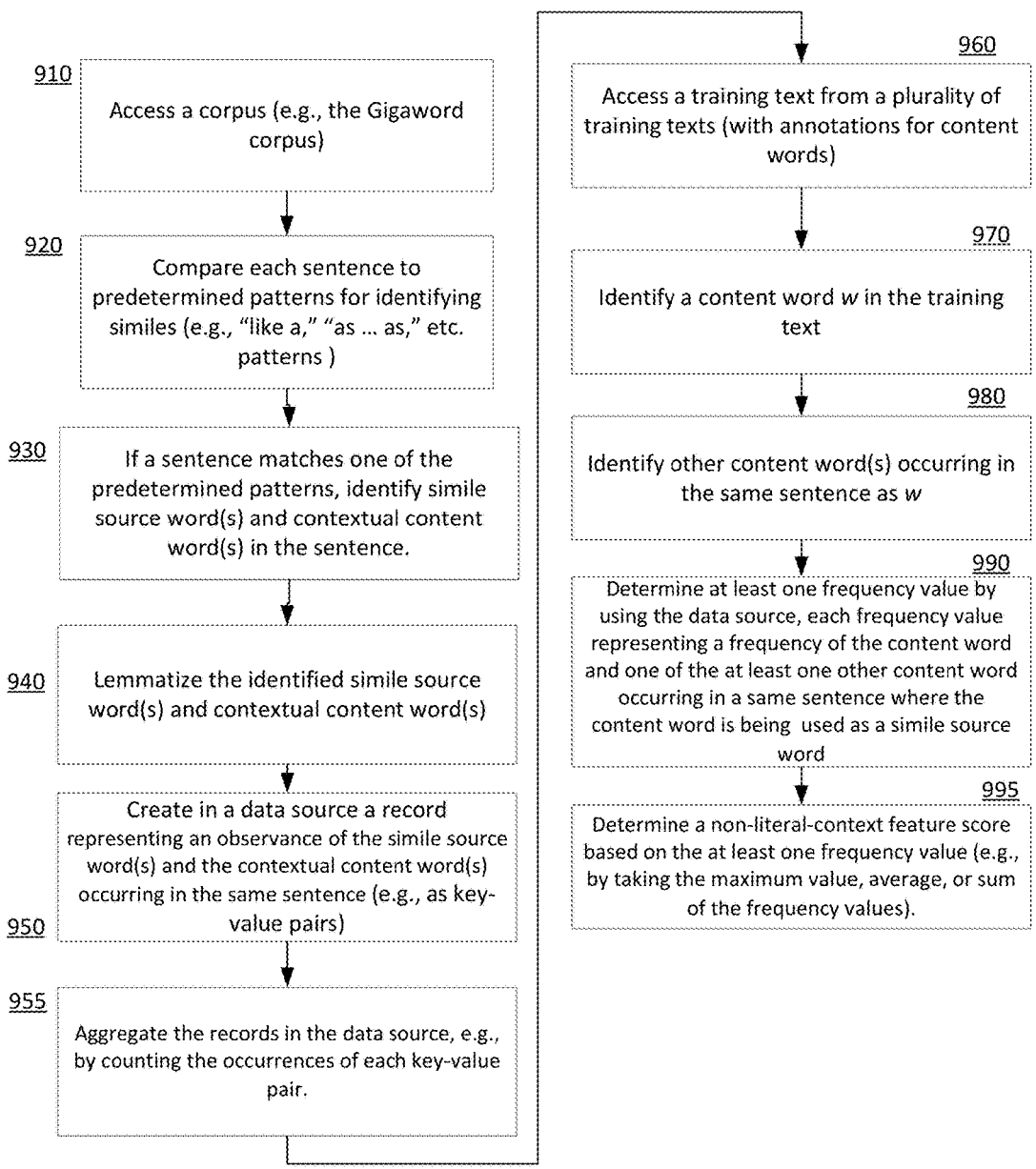
FIG. 9 is a flow diagram depicting a computer-implemented method of extracting a non-literal-context feature score for a content word.

FIG. 9 is a flow diagram depicting a computer-implemented method of extracting a non-literal-context feature score for a content word. In contrast to the literal-context feature described above, the non-literal-context feature utilizes witness words to identify non-literal contexts. In some embodiments it may be desirable to generate a data source that allows non-literal-context witness words to be quickly looked up. For example, an algorithm may access a corpus, such as the Gigaword corpus 910. The algorithm may compare each sentence in the corpus to predetermined patterns for identifying non-literal context 920. For example, patterns for similes may include:

"as a" pattern—e.g., cunning as a fox
"like a" pattern—e.g., eat like a pig
"as . . . as" pattern—e.g., as blind as a bat Once the algorithm finds a sentence that matches one of the patterns, it may, e.g., identify the simile source word(s) (i.e., the source of the figurative analogy, such as fox, pig, and bat in the above examples) and the other contextual content word(s) in the sentence (e.g., cunning, eat, and blind 930. Finding a sentence that matches one of the patterns indicates that the source word is likely being used non-literally or figuratively, in which case the contextual content words serve as non-literal-context witnesses. In some embodiments, the identified source/figurative word and the contextual content words may be lemmatized 940. In one implementation, a record may be generated in the data source to represent an observance of a figurative word (e.g., simile source word) co-occurring with a contextual content word 950. For example, a key-value pair entry may be added to the data source, where the key is the figurative word (e.g., fox) and the value is the contextual content word (e.g., cunning). In another example, a record may be a key-vector pair, where the key is the figurative word (e.g., fox) and the vector includes all the contextual content words that are non-literal-context witnesses to the figurative word (e.g., cunning, smart, etc.). The data source records may keep a running count of observances. For example, each observance of a particular pair of figurative word and contextual content word may trigger a corresponding counter to be incremented by one. In other implementations, the records may be aggregated such that the data source has a summary witness record for each figurative word 955. For example, a data source record for the figurative word fox may include cunning (70), smart (33), politician (6), etc., where the number in each parenthesis represents the number of time the corresponding witness word occurred with fox in the corpus when fox was being used figuratively (e.g., when it is being used as a simile source word).

In one embodiment, the non-literal-context data source (e.g., generated at 955 in FIG. 9) may be used for looking up witness information during non-literal-context feature extraction. During an extraction process, an extraction algorithm may automatically accessed a training text from storage (e.g., hard drive or memory) 960 and identify a content word therein (e.g., based on the assigned part-of-speech tag) 970. Once the target content word has been identified, the algorithm may identify other content word(s) occurring in the same sentence as the target content word 980. For example, in the sentence, "That politician is cunning like a fox," if fox is the target content word for which features are currently being extracted, then the other content words may be politician and cunning. For each of the other content words (e.g., politician or cunning), the algorithm may then determine a frequency of that content word occurring in the same sentence as the target content word, where the target content word is being used figuratively (e.g., as a simile source word) 990. In one implementation, this may be done by querying the data source (e.g., generated at 955 in FIG. 9) to look up the witness records associated the target content word. In the example where the target content word is fox and the witness content word is cunning, the data source may return a result indicating that cunning is a non-literal-use witness for fox N times (e.g., 70 times, continuing the example above). Similarly, the data source may return frequency value M for the other content word politician (e.g., 6 times). One or more of the frequency values corresponding to the other content words may then be transformed into a non-literal-context feature score for the target content word 995. For example, the non-literal-context feature score may be an average, maximum value, or sum of N and M, or any other predetermined metric to capture the strength of the non-literal-context witnesses based on the frequency values. Any one of N and M may be 0 if there is no matching record in the data source for the corresponding witness word. As described above, in some embodiments the frequency values may be weighted using, e.g., tf-idf. Intuitively, a high non-literal-context feature score indicates that the current context of the target content word is similar to previous contexts where the target word was used non-literally. As described above, the non-literal-context feature scores for each content word in the training texts may be used to train the prediction model for predicting figurative words (e.g., the non-literal-context feature scores may be used as data point values for independent variables in the model, and the associated content word's annotation, such as whether the content word is being used figuratively, may be used as a value for the dependent variable).

As described above, the foregoing features may be used to generate a prediction model for predicting figurative words in a text (e.g., constructed essays), and the prediction results from the model may in turn be used by a scoring engine to score constructed texts. These computerized, model-based approaches for scoring constructed texts using metaphor detection are very different from conventional human scoring of, e.g., a test taker's constructed writings. In conventional human scoring of constructed texts, a human grader reads a text and makes a holistic, mental judgment about its writing quality and assigns a score. While a human scorer may generally take into account things like, e.g., mechanics, sentence structure, vocabulary, and flow, conventional human grading of constructed texts does not involve the use of the computer models, associated features/variables, training of the models based on sample data and statistical information to calculate weights of the features/variables, computer processing to parse the text to be scored and representing such parsed text with suitable data structures, and application of the computer models to those data structures to score the quality of the text, as described herein. Also, conventional human scoring suffers from a lack of consistency among different human scorers as well as a lack of consistency applied to different texts scored by the same scorer. Computerized scoring as described herein does not suffer from such drawbacks.

Figure 10A:
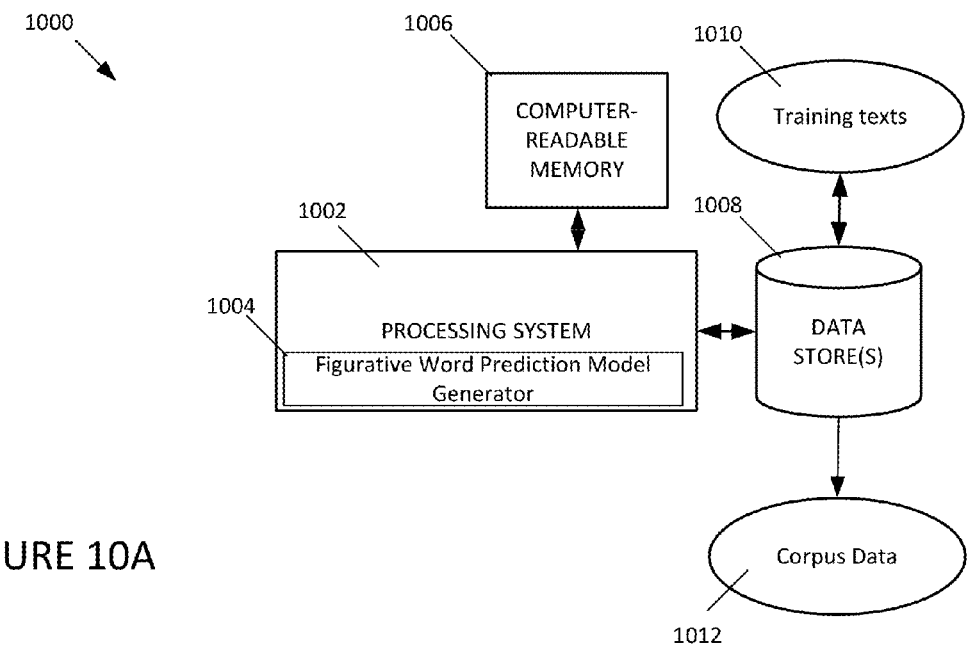
FIGS. 10A, 10B, and 10C depict example systems for use in implementing a system for predicting figurative content words.
Figure 10B:
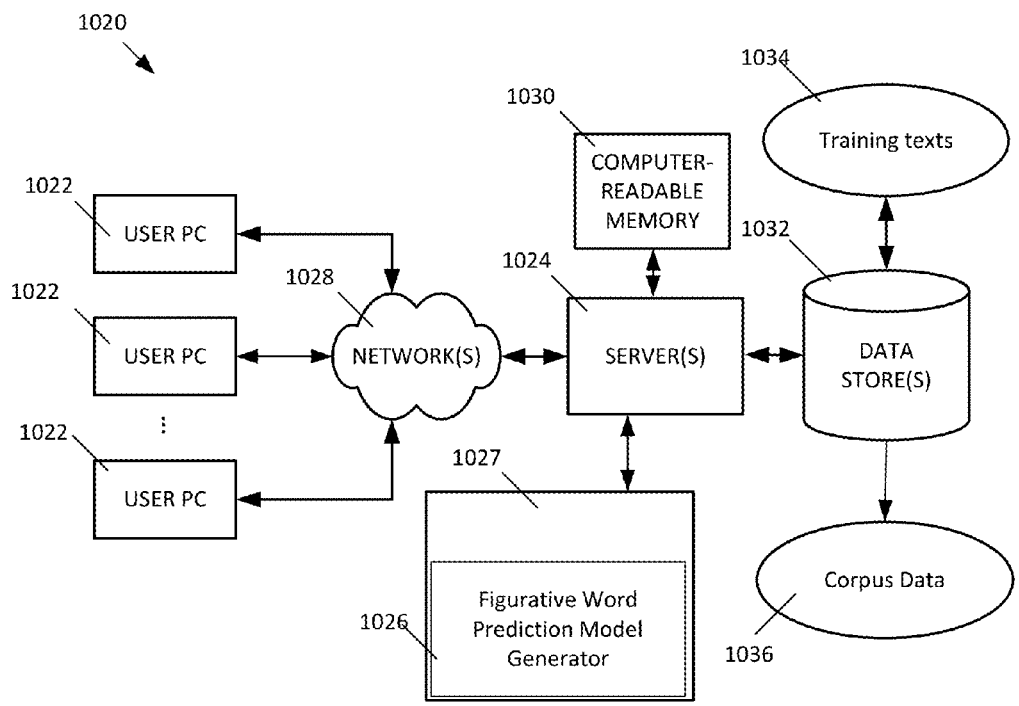
Figure 10C:
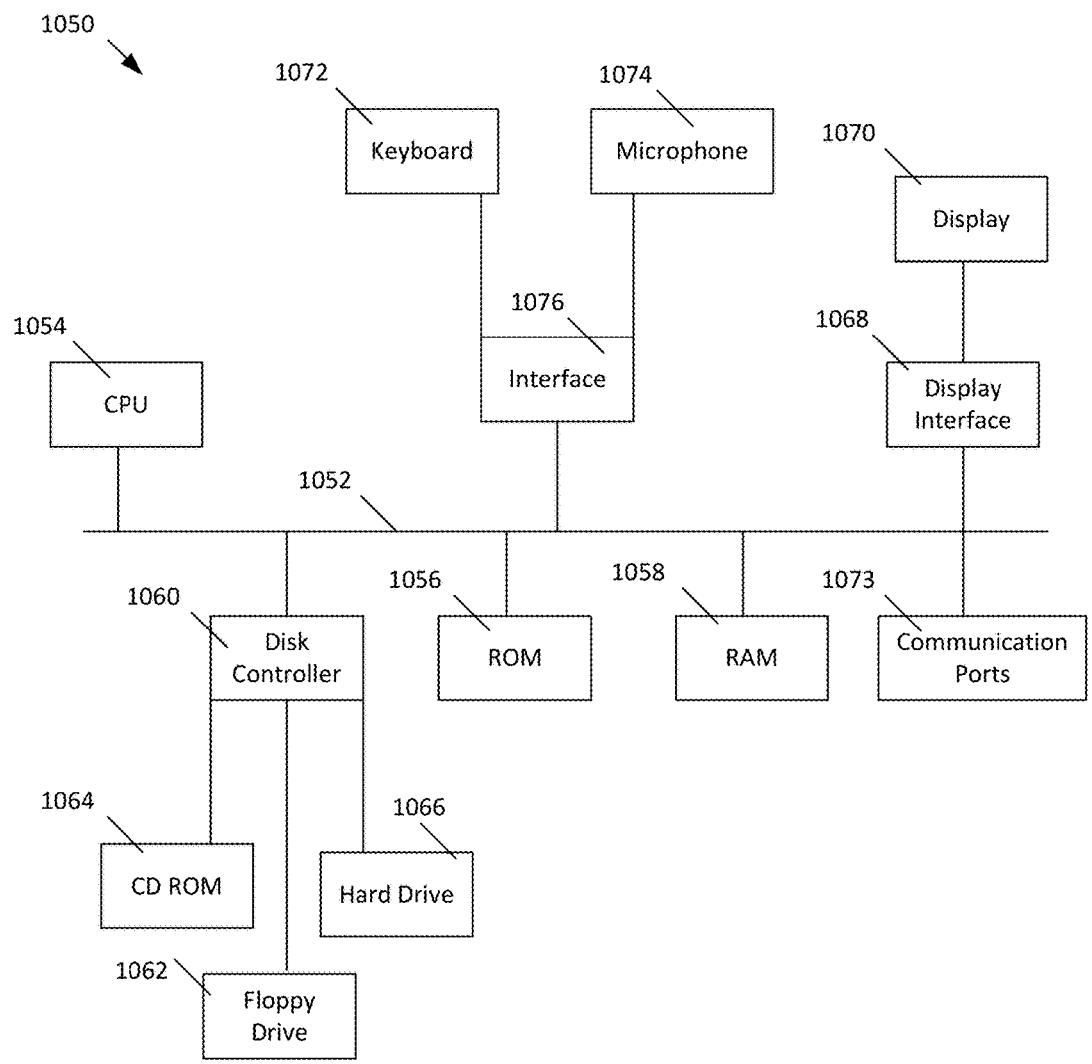

Additional examples will now be described with regard to additional exemplary aspects of implementation of the approaches described herein. FIGS. 10A, 10B, and 10C depict example systems for use in implementing a system for predicting figurative content words. For example, FIG. 10A depicts an exemplary system 900 that includes a standalone computer architecture where a processing system 902 (e.g., one or more computer processors located in a given computer or in multiple computers that may be separate and distinct from one another) includes a figurative word prediction model generator 904 being executed on it. The processing system 902 has access to a computer-readable memory 906 in addition to one or more data stores/data sources 908. The one or more data stores 908 may include training texts 910 as well as corpus data 912.

FIG. 10B depicts a system 920 that includes a client server architecture. One or more user PCs 922 access one or more servers 924 running a figurative word prediction model generator 926 on a processing system 927 via one or more networks 928. The one or more servers 924 may access a computer readable memory 930 as well as one or more data stores 932. The one or more data stores 932 may contain training texts 934 as well as corpus data 936.

FIG. 10C shows a block diagram of exemplary hardware for a standalone computer architecture 950, such as the architecture depicted in FIG. 10A that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 956 and random access memory (RAM) 958, may be in communication with the processing system 954 and may contain one or more programming instructions for performing the method of implementing a figurative word prediction model generator. Optionally, program instructions may be stored on a non-transitory computer readable storage medium such as a magnetic disk, optical disk, recordable memory device, flash memory, or other physical storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 973.

In addition to the standard computer-type components, the hardware may also include data input devices, such as a keyboard 972, or other input device 974, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of generating a model for predicting whether a content word is being used figuratively, comprising:

accessing, with a processing system, a plurality of training texts, each training text including content words, and each content word having a corresponding annotation indicating whether the content word is being used figuratively in the associated training text;

accessing, with the processing system, a plurality of topic models generated from a first corpus;
for each content word in the plurality of training texts, assigning, with the processing system, a plurality of topic-model feature scores to the content word, each topic-model feature score being associated with one of the plurality of topic models and determined based on:
 determining, with the processing system, a first probability of the content word being used in a topic represented by the topic model;
 determining, with the processing system, a second probability of the content word being used in a second corpus; and
 computing, with the processing system, the topic-model feature score using the first probability and the second probability; and
generating, with the processing system, a prediction model for predicting whether a content word is being used figuratively, the generating being based on at least one of the plurality of topic-model feature scores and the annotations.

2. The method of claim 1, comprising:
accessing, with the processing system, a text to be evaluated;
identifying, with the processing system, content words in the text;
for each of the identified content words in the text, predicting, with the processing system, whether the content word is being used figuratively in the text by using the prediction model; and
generating, with the processing system, an evaluation score for the text based on the predictions.

3. The method of claim 1, wherein the first corpus and the second corpus are identical.

4. The method of claim 1, comprising:
for each content word in the plurality of training texts, determining, with the processing system, a unigram feature score based on a frequency of the content word being used figuratively in a training corpus;
wherein the generating of the prediction model is further based on the unigram feature scores.

5. The method of claim 1, comprising:
for each content word that is not an auxiliary word in the plurality of training texts, determining, with the processing system, a part-of-speech feature score based on a part-of-speech classification of the content word;
wherein the generating of the prediction model is further based on the part-of-speech feature scores.

6. The method of claim 1, comprising:
for each content word in the plurality of training texts, determining, with the processing system, a concreteness feature score based on a predetermined concreteness rating assigned to the content word;
wherein the generating of the prediction model is further based on the concreteness feature scores.

7. The method of claim 6, wherein determining a concreteness feature score includes:
defining a plurality of bins, each bin being associated with a concreteness rating range;
selecting one of the plurality of bins, the selected bin having an associated concreteness rating range that encompasses the predetermined concreteness rating assigned to the content word;
determining the concreteness feature score based on the bin selected.

8. The method of claim 6, wherein determining a concreteness feature score includes:
defining a plurality of bins, each bin being associated with a concreteness rating condition;
selecting one or more of the plurality of bins, each selected bin's concreteness rating condition being satisfied by the predetermined concreteness rating assigned to the content word;
determining the concreteness feature score based on the one or more bins selected.

9. The method of claim 1, comprising:
for each content word that is being used as an adjective or a verb in the plurality of training texts:
 if the content word is an adjective, identifying, with the processing system, an associated word, the associated word being a noun modified by the adjective;
 if the content word is a verb, identifying, with the processing system, an associated word, the associated word being a direct object of the verb;
 determining, with the processing system, a first concreteness rating for the content word and a second concreteness rating for the associated word;
 determining, with the processing system, a concreteness difference feature score based on the first concreteness rating and the second concreteness rating;
wherein the generating of the prediction model is further based on the concreteness difference feature scores.

10. The method of claim 9, wherein a concreteness difference feature is used in the generating of the prediction model if the associated second concreteness rating satisfies a predetermined threshold.

11. The method of claim 1, comprising:
for each sentence in a corpus:
 comparing, with the processing system, the sentence to one or more predetermined patterns for identifying hypernym-hyponym relationships;
 if the sentence matches any of the one or more predetermined patterns, identifying, with the processing system, at least one hypernym in the sentence, at least one hyponym in the sentence, and at least one contextual content word in the sentence other than the hypernym and hyponym, the hyponym being a potential hyponym of the hypernym; and
 creating, in a data source, a record representing an observance of the at least one hypernym and the at least one contextual content word occurring in the same sentence; and
 creating, in a data source, a record representing an observance of the at least one hyponym and the at least one contextual content word occurring in the same sentence;
for each content word in the plurality of training texts:
 identifying, with the processing system, a sentence in which the content word occurs;
 identifying, with the processing system, at least one other content word in the sentence;
 determining, with the processing system, at least one frequency value based on using the data source, each frequency value representing a frequency of the content word and one of the at least one other content word occurring in a same sentence where the content word is being used as a hyponym or a hypernym; and
 determining, with the processing system, a literal-context feature score based on the at least one frequency value;
wherein the generating of the prediction model is further based on the literal-context feature scores.

12. The method of claim 1, comprising:
for each sentence in a corpus:
  comparing, with the processing system, the sentence to one or more predetermined patterns for identifying similes;
  if the sentence matches any of the one or more predetermined patterns, identifying, with the processing system, at least one simile source word in the sentence and at least one contextual content word in the sentence other than the simile source word; and
  creating, in a data source, a record representing an observance of the at least one simile source word and the at least one contextual content word occurring in the same sentence;
for each content word in the plurality of training texts:
  identifying, with the processing system, a sentence in which the content word occurs;
  identifying, with the processing system, at least one other content word in the sentence;
  determining, with the processing system, at least one frequency value based on using the data source, each frequency value representing a frequency of the content word and one of the at least one other content word occurring in a same sentence where the content word is being used as a simile source word; and
  determining, with the processing system, a non-literal-context feature score based on the at least one frequency value;
wherein the generating of the prediction model is further based on the non-literal-context feature scores.

13. The method of claim 1, comprising:
accessing, with the processing system, a third corpus, the third corpus including texts associated with a plurality of predetermined topics;
for each of the plurality of predetermined topics, generating, with the processing system, a plurality of subtopic models based the texts associated with that predetermined topic;
for each content word in the plurality of training texts:
  identifying, with the processing system, one of the plurality of predetermined topics related to the training text in which the content word occurs;
  for each of the plurality of subtopic models associated with the identified predetermined topic:
    determining, with the processing system, a third probability of the content word being used in a subtopic represented by the subtopic model;
    determining, with the processing system, a fourth probability of the content word being used in the texts associated with the identified predetermined topic; and
    computing, with the processing system, a subtopic-model score using the third probability and the fourth probability;
  assigning, with the processing system, an off-topic feature score to the content word based on the computed subtopic-model scores;
wherein the generating of the prediction model is further based on the off-topic feature scores.

14. The method of claim 1, wherein the generating of the prediction model is based on a model training algorithm that penalizes mistaken predictions of figurative words more than mistaken predictions of non-figurative words.

15. A computer-implemented method of scoring a text based on at least predicted figurative word usage in the constructed texts, the method comprising:
accessing a text to be evaluated with a processing system;
identifying content words in the text with the processing system;
extracting one or more features from each of the content words with the processing system;
predicting, with a processing system, whether each of the content words is being used figuratively in the text, the predicting being based on a prediction model and the extracted one or more features; and
generating an evaluation score with the processing system for the text based on the predictions;
wherein the one or more features include at least one of a topic model feature, a unigram feature, a part-of-speech feature, a concreteness feature, a concreteness difference feature, a literal context feature, a non-literal context feature, and an off-topic feature.

16. A system for generating a model for predicting whether a content word is being used figuratively, comprising:
a processing system; and
a memory;
wherein the processing system is configured to execute steps comprising:
  accessing a plurality of training texts, each training text including content words, and each content word having a corresponding annotation indicating whether the content word is being used figuratively in the associated training text;
  accessing a plurality of topic models generated from a first corpus;
  for each content word in the plurality of training texts, assigning a plurality of topic-model feature scores to the content word, each topic-model feature score being associated with one of the plurality of topic models and determined based on:
    determining a first probability of the content word being used in a topic represented by the topic model;
    determining a second probability of the content word being used in a second corpus; and
    computing the topic-model feature score using the first probability and the second probability; and
  generating a prediction model for predicting whether a content word is being used figuratively, the generating being based on at least one of the plurality of topic-model feature scores and the annotations.

17. The system of claim 16, wherein the processing system is configured to execute steps comprising:
accessing a text to be evaluated;
identifying content words in the text;
for each of the identified content words in the text, predicting whether the content word is being used figuratively in the text based on using the prediction model; and
generating an evaluation score for the text based on the predictions.

18. The system of claim 16, wherein the first corpus and the second corpus are identical.

19. The system of claim 16, wherein the processing system is configured to execute steps comprising:
for each content word in the plurality of training texts, determining a unigram feature score based on a frequency of the content word being used figuratively in a training corpus;
wherein the generating of the prediction model is further based on the unigram feature scores.

20. The system of claim 16, wherein the processing system is configured to execute steps comprising:
for each content word that is not an auxiliary word in the plurality of training texts, determining a part-of-speech feature score based on a part-of-speech classification of the content word;
wherein the generating of the prediction model is further based on the part-of-speech feature scores.

21. The system of claim 16, wherein the processing system is configured to execute steps comprising:
for each content word in the plurality of training texts, determining a concreteness feature score based on a predetermined concreteness rating assigned to the content word;
wherein the generating of the prediction model is further based on the concreteness feature scores.

22. The system of claim 21, wherein determining a concreteness feature score includes:
defining a plurality of bins, each bin being associated with a concreteness rating range;
selecting one of the plurality of bins, the selected bin having an associated concreteness rating range that encompasses the predetermined concreteness rating assigned to the content word;
determining the concreteness feature score based on the bin selected.

23. The system of claim 21, wherein determining a concreteness feature score includes:
defining a plurality of bins, each bin being associated with a concreteness rating condition;
selecting one or more of the plurality of bins, each selected bin's concreteness rating condition being satisfied by the predetermined concreteness rating assigned to the content word;
determining the concreteness feature score based on the one or more bins selected.

24. The system of claim 16, wherein the processing system is configured to execute steps comprising:
for each content word that is being used as an adjective or a verb in the plurality of training texts:
if the content word is an adjective, identifying an associated word, the associated word being a noun modified by the adjective;
if the content word is a verb, identifying an associated word, the associated word being a direct object of the verb;
determining a first concreteness rating for the content word and a second concreteness rating for the associated word;
determining a concreteness difference feature score based on the first concreteness rating and the second concreteness rating;
wherein the generating of the prediction model is further based on the concreteness difference feature scores.

25. The system of claim 24, wherein a concreteness difference feature is used in the generating of the prediction model if the associated second concreteness rating satisfies a predetermined threshold.

26. The system of claim 16, wherein the processing system is configured to execute steps comprising:
for each sentence in a corpus:
comparing the sentence to one or more predetermined patterns for identifying hypernym-hyponym relationships;
if the sentence matches any of the one or more predetermined patterns, identifying at least one hypernym in the sentence, at least one hyponym in the sentence, and at least one contextual content word in the sentence other than the hypernym and hyponym, the hyponym being a potential hyponym of the hypernym; and
creating, in a data source, a record representing an observance of the at least one hypernym and the at least one contextual content word occurring in the same sentence; and
creating, in a data source, a record representing an observance of the at least one hyponym and the at least one contextual content word occurring in the same sentence;
for each content word in the plurality of training texts:
identifying a sentence in which the content word occurs;
identifying at least one other content word in the sentence;
determining at least one frequency value based on using the data source, each frequency value representing a frequency of the content word and one of the at least one other content word occurring in a same sentence where the content word is being used as a hyponym or a hypernym; and
determining a literal-context feature score based on the at least one frequency value;
wherein the generating of the prediction model is further based on the literal-context feature scores.

27. The system of claim 16, wherein the processing system is configured to execute steps comprising:
for each sentence in a corpus:
comparing the sentence to one or more predetermined patterns for identifying similes;
if the sentence matches any of the one or more predetermined patterns, identifying at least one simile source word in the sentence and at least one contextual content word in the sentence other than the simile source word; and
creating, in a data source, a record representing an observance of the at least one simile source word and the at least one contextual content word occurring in the same sentence;
for each content word in the plurality of training texts:
identifying a sentence in which the content word occurs;
identifying at least one other content word in the sentence;
determining at least one frequency value based on using the data source, each frequency value representing a frequency of the content word and one of the at least one other content word occurring in a same sentence where the content word is being used as a simile source word; and
determining a non-literal-context feature score based on the at least one frequency value;
wherein the generating of the prediction model is further based on the non-literal-context feature scores.

28. The system of claim 16, wherein the processing system is configured to execute steps comprising:
accessing a third corpus, the third corpus including texts associated with a plurality of predetermined topics;
for each of the plurality of predetermined topics, generating a plurality of subtopic models based the texts associated with that predetermined topic;
for each content word in the plurality of training texts:
identifying one of the plurality of predetermined topics related to the training text in which the content word occurs;

for each of the plurality of subtopic models associated with the identified predetermined topic:
  determining a third probability of the content word being used in a subtopic represented by the subtopic model;
  determining a fourth probability of the content word being used in the texts associated with the identified predetermined topic; and
  computing a subtopic-model score using the third probability and the fourth probability;
assigning an off-topic feature score to the content word based on the computed subtopic-model scores;
wherein the generating of the prediction model is further based on the off-topic feature scores.

29. The system of claim 16, wherein the generating of the prediction model is based on a model training algorithm that penalizes mistaken predictions of figurative words more than mistaken predictions of non-figurative words.

30. A system for scoring a text based on at least predicted figurative word usage in the constructed texts, comprising:
a processing system; and
a memory;
wherein the processing system is configured to execute steps comprising:
  accessing a text to be evaluated;
  identifying content words in the text;
  extracting one or more features from each of the content words;
  predicting whether each of the content words is being used figuratively in the text, the predicting being based on a prediction model and the extracted one or more features; and
  generating an evaluation score for the text based on the predictions;
  wherein the one or more features include at least one of a topic model feature, a unigram feature, a part-of-speech feature, a concreteness feature, a concreteness difference feature, a literal context feature, a non-literal context feature, and an off-topic feature.

31. A non-transitory computer-readable medium for generating a model for predicting whether a content word is being used figuratively, comprising instructions which when executed cause a processing system to carry out steps comprising:
  accessing a plurality of training texts, each training text including content words, and each content word having a corresponding annotation indicating whether the content word is being used figuratively in the associated training text;
  accessing a plurality of topic models generated from a first corpus;
  for each content word in the plurality of training texts, assigning a plurality of topic-model feature scores to the content word, each topic-model feature score being associated with one of the plurality of topic models and determined based on:
    determining a first probability of the content word being used in a topic represented by the topic model;
    determining a second probability of the content word being used in a second corpus; and
    computing the topic-model feature score using the first probability and the second probability; and
  generating a prediction model for predicting whether a content word is being used figuratively, the generating being based on at least one of the plurality of topic-model feature scores and the annotations.

32. A non-transitory computer-readable medium for scoring a text based on at least predicted figurative word usage in the constructed texts, comprising instructions which when executed cause a processing system to carry out steps comprising:
  accessing a text to be evaluated;
  identifying content words in the text;
  extracting one or more features from each of the content words;
  predicting whether each of the content words is being used figuratively in the text, the predicting being based on a prediction model and the extracted one or more features; and
  generating an evaluation score for the text based on the predictions;
wherein the one or more features include at least one of a topic model feature, a unigram feature, a part-of-speech feature, a concreteness feature, a concreteness difference feature, a literal context feature, a non-literal context feature, and an off-topic feature.

33. A computer-implemented method of scoring a text based on at least predicted figurative word usage in the constructed texts, the method comprising:
  accessing a text to be evaluated with a processing system;
  identifying content words in the text with the processing system;
  extracting one or more features from each of the content words with the processing system, wherein extracting one or more features includes determining whether a particular content word belongs in a particular word group, wherein the particular word group is associated with a figurative usage likelihood;
  predicting, with a processing system, whether each of the content words is being used figuratively in the text, the predicting being based on a prediction model and the extracted one or more features; and
  generating an evaluation score with the processing system for the text based on the predictions.

34. The method of claim 33, wherein extracting one or more features further comprises:
  identifying an associate word that is associated with the particular content word;
  determining whether the associate word belongs in a particular associate word group, wherein the particular associate word group is associated with another figurative usage likelihood;
  wherein a prediction of whether the particular content word is being used figuratively is based on the figurative usage likelihood and the another figurative usage likelihood.

35. The method of claim 34, wherein the associate word is in a same sentence as the particular content word.

* * * * *